US005532944A

United States Patent [19]
Battista

[11] Patent Number: 5,532,944
[45] Date of Patent: Jul. 2, 1996

[54] MULTI-CHANNEL ANALYSIS SYSTEM AND METHOD USING DIGITAL SIGNAL PROCESSING

[75] Inventor: Richard M. Battista, San Diego, Calif.

[73] Assignee: Sorrento Electronics, Inc., San Diego, Calif.

[21] Appl. No.: 302,191

[22] Filed: Jul. 28, 1994

[51] Int. Cl.[6] .................................................. G06J 1/00
[52] U.S. Cl. ................................ 364/602; 364/481
[58] Field of Search .............................. 364/602, 481, 364/486, 487, 496; 324/121 R

[56] References Cited

U.S. PATENT DOCUMENTS

| | | | |
|---|---|---|---|
| 3,634,688 | 1/1972 | DiRocco | 250/71.5 |
| 3,670,150 | 1/1972 | Hogg et al. | 235/151.3 |
| 4,031,367 | 6/1977 | Murphy | 364/486 |
| 4,041,386 | 8/1977 | Thomas et al. | 364/481 X |
| 4,651,006 | 3/1987 | Valenta | 250/362 |
| 4,746,816 | 5/1988 | Olesen | 307/351 |
| 4,833,326 | 5/1989 | Valenta et al. | 250/362 |
| 4,862,004 | 8/1989 | Hiroshi et al. | 250/369 |
| 5,067,090 | 11/1991 | Seeman | 364/486 |
| 5,132,543 | 7/1992 | Valentine et al. | 250/388 |
| 5,146,093 | 9/1992 | Valenta et al. | 250/362 |
| 5,170,359 | 12/1992 | Sax et al. | 364/481 X |
| 5,206,174 | 4/1993 | Gehrke et al. | 436/58 |

*Primary Examiner*—Tan V. Mai
*Attorney, Agent, or Firm*—Fitch, Even, Tabin & Flannery

[57] ABSTRACT

A multi-channel analyzer has a pulse conditioner coupled to a detector signal, a trigger circuit coupled to the detector signal, a signal processor coupled to the pulse conditioner, and the trigger circuit, a control circuit coupled to the signal processor, to the trigger circuit, and to the pulse conditioner, and a clock circuit coupled to the control circuit. The pulse conditioner filters, shapes and digitizes the detector signal, and generates a pulse data signal; and the trigger circuit detects pulses in the detector signal and generates a trigger signal. The signal processor performs pulse height analysis on the pulse data signal, and the trigger signal is used to determine a gross number of pulses detected by the trigger circuit. The signal processor also uses the trigger signal to detect pulse pileup. The control circuit is used to control the filtering, shaping and digitizing within the pulse conditioner, and is used to control timing within the pulse conditioner and within the signal processor. The clock circuit generates a clock signal, which the control circuit used to control the timing within the pulse conditioner signal processor.

20 Claims, 8 Drawing Sheets

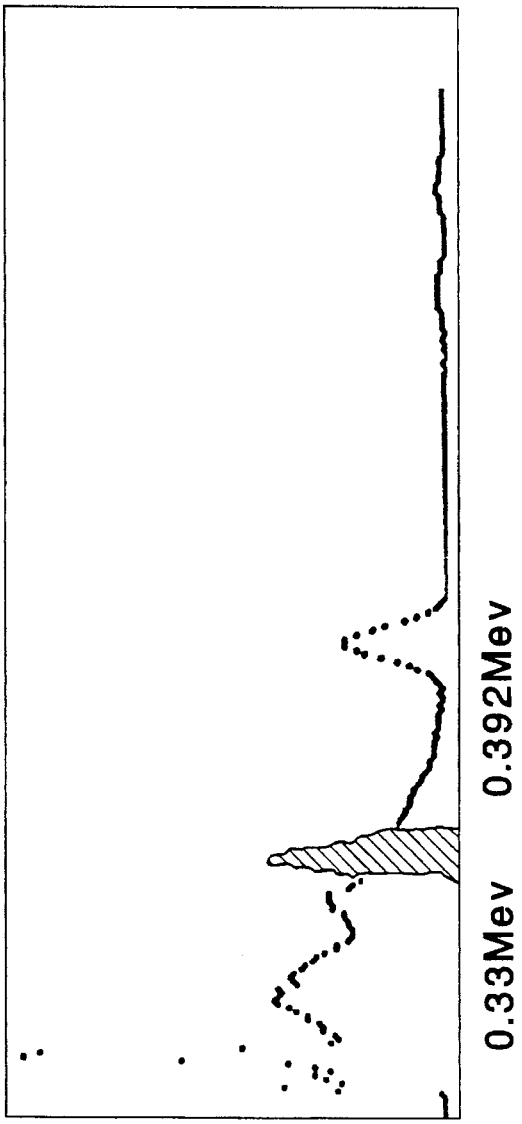

MULTI-CHANNEL ANALYSIS SYSTEM AND METHOD USING DIGITAL SIGNAL PROCESSING

A portion of the disclosure of this patent document contains material which is subject to copyright protection. The copyright owner has no objection to the facsimile reproduction by anyone of the patent document or the patent disclosure, as it appears in the Patent and Trademark Office patent files, but otherwise reserves all copyrights whatsoever.

BACKGROUND OF THE INVENTION

The present invention relates to pulse height analysis in a multi-channel analyzer, and more particularly to the accurate detection and height analysis of pulses generated by a radiation detector in a multi-channel analyzer. Even more particularly, the present invention relates to accurate real-time detection and height analysis using digital signal processing of pulses generated by a scintillation-type radiation detector in a multi-channel analyzer.

The detection of sub-atomic particles using ionization chambers, proportional counters, Geiger counters, scintillation counters, Cadmium Telluride detectors, and semiconductor detectors, is known in the art of radiation/particle detection. The scintillation counter is preferred for use in detecting particles that arrive as few as only a few nanoseconds apart. The scintillation counter is also useful in determining the energy of detected sub-atomic particles, because the amplitude of the output pulse generated by the scintillation counter is proportional to the energy of the incident particle.

One way in which scintillation counters are utilized is in what are known as voltage window analyzers. Voltage window analyzers generate an output pulse (which is generally a digital pulse) in the event their input is an electrical pulse having a height (i.e., peak voltage amplitude) that exceeds a lower voltage threshold but that does not exceed an upper voltage threshold. The range of voltages between the lower voltage threshold and the upper voltage threshold is referred to as the voltage "window" or channel.

Referring to FIG. 1, a graph is shown of an sample input signal to and a sample output signal from a voltage window analyzer. Time is shown on the horizontal (abscissa) axes while voltage is shown on the vertical (ordinate) axis. A first (in time sequence) input pulse 10 is shown having a peak voltage amplitude that is less than the lower voltage threshold 12. In response to the first input pulse, the output 14 of the voltage window analyzer remains "not asserted," thereby indicating that the first input pulse 10 does not have a peak voltage amplitude that falls within the "window" 16.

A second input pulse 18 is shown having a peak voltage amplitude that falls between the upper voltage threshold 20 and the lower voltage threshold 12. As a result, the voltage window analyzer generates an output pulse 22, i.e., becomes "asserted" for a prescribed period of time T, in response to the second input pulse 18, thereby indicating that the second input pulse 18 has a peak voltage amplitude that falls within the "window" 16 or channel.

A third input pulse 24 is shown having a peak voltage amplitude that falls above the upper voltage threshold 20. As a result, the voltage window analyzer output 26, remains "not asserted" in response to the third input pulse 24, thereby indicating that the third input pulse 24 has a peak voltage amplitude that does not fall within the "window" 16.

In this way, voltage window analyzers are able to detect input pulses generated by a scintillation-type (or other-type) detector that correspond to incoming particles of energies that are within the "window" 16. Note that the "window," while represented as a window of voltages, corresponds to a window of particle energies.

In practice, such voltage window analyzers have several "windows," or channels, that are adjacent to one another along a voltage scale 28, i.e., vertical axis. Typical voltage window analyzers are capable of detecting the voltage amplitudes of input pulses with a resolution that corresponds to the height of each voltage window. In a typical voltage window analyzer, several hundred, or even more than one-thousand, "windows," or channels, are utilized. Such voltage window analyzers are typically implemented using a sample-and-hold circuit in combination with an analog-to-digital converter.

Problematically, voltage window analyzers, or multi-channel analyzers (MCAs) as they are commonly called, suffer from inaccuracies caused by several phenomenon. First, the baseline of the output signal from the scintillation counter may shift (or drift) over time due to interference from high frequency communications lines, solenoid activations, motor activations etc. that affect the power supply to the multi-channel analyzer. A fourth input pulse 30 is shown in FIG. 1 that is an example of a scintillation-type detector's output signal (or detector signal) that has been baseline shifted, i.e., that has been affected by baseline shift (or drift). As shown, the fourth input pulse 30 has a peak (measured from the baseline 32 of the fourth input pulse 30 to the peak 34 of the fourth input pulse 30) that falls within the "window" 16. Problematically, however, the peak 34 of the fourth input pulse 30 is not detected as falling within the "window" 16 because the amplitude of the peak 34 (measured from the horizontal axis 36 to the peak 34 of the fourth input pulse 30) has been increased by the baseline shift (measured from the horizontal axis 36 to the baseline 32 of the fourth input pulse 30) to a voltage above the upper voltage threshold 20. In the case of a multi-channel analyzer, the peak 34 of the fourth input pulse 30 will be detected as falling within a "window" or channel that is above the "window" 16 shown in FIG. 1. Thus, because such baseline shift results in the detection of particles of higher energies than those that are actually impinging upon the scintillation counter, a multi-channel analyzer that is able to accurately detect and compensate for baseline shift is highly desirable.

Referring to FIG. 2, the problem of noise that is present on the detector signal is illustrated. Noise is introduced on the detector signal by high frequency equipment, motors, compressors, solenoids, pumps etc. that may or may not share a common electrical energy source with the multi-channel analyzer. Problematically, such noise creates uncertainty in the location of the peak of an electrical pulse within the electrical signal. Similarly, noise causes uncertainty in the baseline of such electrical signal.

As illustrated in FIG. 2, wherein amplitude is represented on the horizontal axis and time is represented on the vertical axis, the electrical pulse reaches its peak during time $T_1$. Unfortunately, the exact time and amplitude at which the electrical pulse reaches its peak cannot be determined due to the noise present in the detector signal. Instead, the noise results in the generation of several apparent or false peaks 40, 40' in the detector signal rather than one distinct peak.

After peaking sometime during time $T_1$, the electrical pulse subsides during time $T_2$, and reaches its baseline sometime during time $T_3$. Unfortunately however, the exact time and the amplitude at which the electrical pulse reaches its baseline cannot be accurately detected due to the noise. Thus, a great deal of uncertainty in both the location of the peak and the baseline of the electrical signal, and therefore the pulse height, is caused by the noise in the electrical (or detector) signal. Because the accurate determination of pulse height is dependent on the accurate location of the pulse's peak and baseline, a multi-channel analyzer that can accurately detect pulse height in the presence of noise on the electrical pulse is desirable.

Referring to FIG. 3, wherein amplitude is represented on the vertical axis and time is represented on the horizontal axis, the problem of pulse pileup is illustrated. Pulse pileup occurs when more than one electrical pulse is generated by the scintillation counter in response to several particles impacting the scintillation counter within a very short period of time. As a result of pulse pileup, a first pulse 50 generated by the scintillation counter in response to a first particle does not reach its baseline by the time a second pulse 52 is generated by the scintillation counter in response to a second particle. As a result, the amplitude of the peak 54 generated in response to the first and second particles is the sum (i.e., a "sum" pulse) of the amplitudes of the first and second pulses 52,50. In response to such sum pulses, multi-channel analyzers that are unable to detect pulse pileup will generate an output signal indicating the detection of a single pulse having a peak amplitude within a channel (or "window") that corresponds to a range of energies that are greater than the range of energies, i.e., channel 58, in which either the first or second pulses 52,50 peak. Unfortunately, such mis-detection of higher energy particles creates inaccuracy and uncertainty in the pulse height analysis performed by some multi-channel analyzers. Therefore, a multi-channel analyzer that can accurately detect and account for pulse pileup is highly advantageous.

SUMMARY OF THE INVENTION

The present invention addresses the above and other needs.

The present invention advantageously addresses the needs above as well as other needs by providing a device and method for pulse height analysis in a multi-channel analyzer. Advantageously, the device and method of the present invention perform accurate pulse height detection while minimizing the effect of baseline shift, pulse pileup and noise.

The invention can be characterized as a device for performing pulse height analysis on a detector signal in a multi-channel analyzer used in radiation monitoring. The device includes a pulse conditioner coupled to the detector signal. The pulse conditioner filters, shapes and digitizes the detector signal, and generates a pulse data signal in response thereto. A trigger circuit is coupled to the detector signal, and detects pulses in the detector signal. The trigger circuit generates a trigger signal in response to the detecting of the pulses.

The device also includes a signal processor that is coupled to the pulse conditioner, and to the trigger circuit. The signal processor performs the pulse height analysis on the pulse data signal, and uses the trigger signal to determine a gross number of pulses detected by the trigger circuit.

The device further includes a control circuit that is coupled to the signal processor, to the trigger circuit, and to the pulse conditioner; and a clock circuit that is coupled to the control circuit. The control circuit is used to control the digitizing within the pulse conditioner, and is also used to control timing within the pulse conditioner and within the signal processor. The clock circuit generates a clock signal in response to which the control circuit controls the timing within the pulse conditioner and within the signal processor.

In one embodiment, pulse pileup is advantageously detected by the trigger circuit in combination with the signal processor. In practice the filtered, shaped and digitized pulses that reach the signal processor are detected by the signal processor at a relatively slow rate, due to their having a relatively slow rise time relative to such pulses before the filtering, shaping and digitizing. The slow rise time facilitates extremely accurate pulse height analysis, but complicates pulse pileup detection due to increased vulnerability to pulse pileup during the slow and thus longer rise time of the pulses. The trigger circuit is advantageously used to detect the occurrence of the pulses before the pulses are filtered, shaped and digitized. The trigger circuit quickly detects the pulses and generates a trigger pulse in response thereto.

The trigger pulse is passed to the signal processor and in the event more than one trigger pulse is received by the signal processor during a single filtered, shaped and digitized pulse, the signal processor discards the single filtered, shaped and digitized pulse.

In another embodiment, pulse pileup is detected by the control circuit initiating two time periods in response to a first trigger pulse. The first time period is a pulse sample time (PST) during which the filtered, shaped and digitized pulse is sampled. In the event a second trigger pulse is detected during the PST, the filtered, shaped and digitized pulse is discarded as being piled up. The occurrence of the second trigger pulse during the PST, is one way in which the one embodiment, described above, can detect the occurrence of a trigger pulse during the filtered, shaped and digitized pulse, and thus, the one and the other embodiments thus far described function similarly. The second time period, however, provides an additional way in which pulse pileup can be detected. The second time period is a baseline restore (BLR) time, and follows the PST. The BLR time is, e.g., about seven times as long as the PST. If the second trigger pulse is detected during the BLR time, and not during the PST, the previous filtered, shaped and digitized pulse corresponding to the first trigger pulse is not discarded, but the subsequent filtered, shaped and digitized pulse corresponding to the second trigger pulse is discarded, because it is assumed to be piled up with the previous filtered, shaped and digitized pulse. In this way, pulse pileup is detected and can therefore be accounted for in pulse height determinations made by the signal processor.

The present invention may also employ a baseline restore routine that is executed by the signal processor. The baseline restore routine is used to control a level shifter, or baseline adjuster, that shifts the baseline of the filtered, shaped digitized pulses before they are processed by the signal processor so as to minimize the effect of baseline drift. Furthermore, the present invention improves upon the baseline drift compensation that is done by the baseline shifter by employing a difference method in performing the pulse height analysis. Specifically, instead of merely measuring the amplitudes or heights of the filtered, shaped and digitized pulses, based on an absolute baseline, the invention measures the heights of the filtered, shaped and digitized pulses by determining the pulse's peak, and the pulse's baseline and then determining the difference between them. In this way, the baseline shifter continuously and automatically makes adjustments to the baseline of the filtered, shaped and digitized pulses so as to minimize the effect of baseline drift, and furthermore, the difference method is utilized to further minimize the effect of baseline drift.

With respect to noise reduction, the invention may employ several mechanisms. First the filtering and shaping of the pulses dramatically reduces the amount of noise present in the filtered, shaped and digitized pulses. Additionally, a software filter is used to extract accurate peak and baseline information for use in the difference method described above. For example, a matched finite impulse response (FIR) filter can be utilized to process samples near the peak of the pulse and near its baseline in order to determine the location of the peak and baseline. In this way, the invention minimizes the impact of noise or pulse height determinations made in a multi-channel analyzer.

The invention may also be characterized as a method of pulse height analysis of a pulse signal, wherein the method includes: detecting pulses within the pulse signal; (b) generating a trigger signal in response to the detecting of pulses; (c) shaping the pulse signal so as to generate a Gaussian-shaped signal; and (d) detecting pulses within the Gaussian-shaped signal. The method further includes: (e) detecting pulse pile-up within the Gaussian-shaped signal in response to the trigger signal and in response to the detecting of the pulses within the Gaussian-shaped signal; (f) detecting pulse height of at least a portion of the pulses that are detected within the Gaussian-shaped signal; and (g) counting the number of at least a portion of the pulses detected within the Gaussian-shaped signal. The portion of the pulses is selected based on the detecting of pulse pile-up within the Gaussian-shaped signal.

It is therefore a feature of the invention to perform pulse height analysis on pulses within an electrical signal.

It is another feature of the invention to detect and account for pulse pileup within the electrical signal.

It is a further feature of the invention to generate a count of the pulses within the electrical signal.

It is an additional feature of the invention to detect and account for baseline drift within the electrical signal.

It is an added feature of the invention to reduce the effect of noise within the electrical signal.

BRIEF DESCRIPTION OF THE DRAWINGS

The above and other aspects, features and advantages of the present invention will be more apparent from the following more particular description thereof, presented in conjunction with the following drawings wherein:

FIG. 12 is an illustration of a graphical display that is generated on an electroluminescent display (ELD) that is a part of the multi-channel analyzer of FIG. 5.

Figure 5:
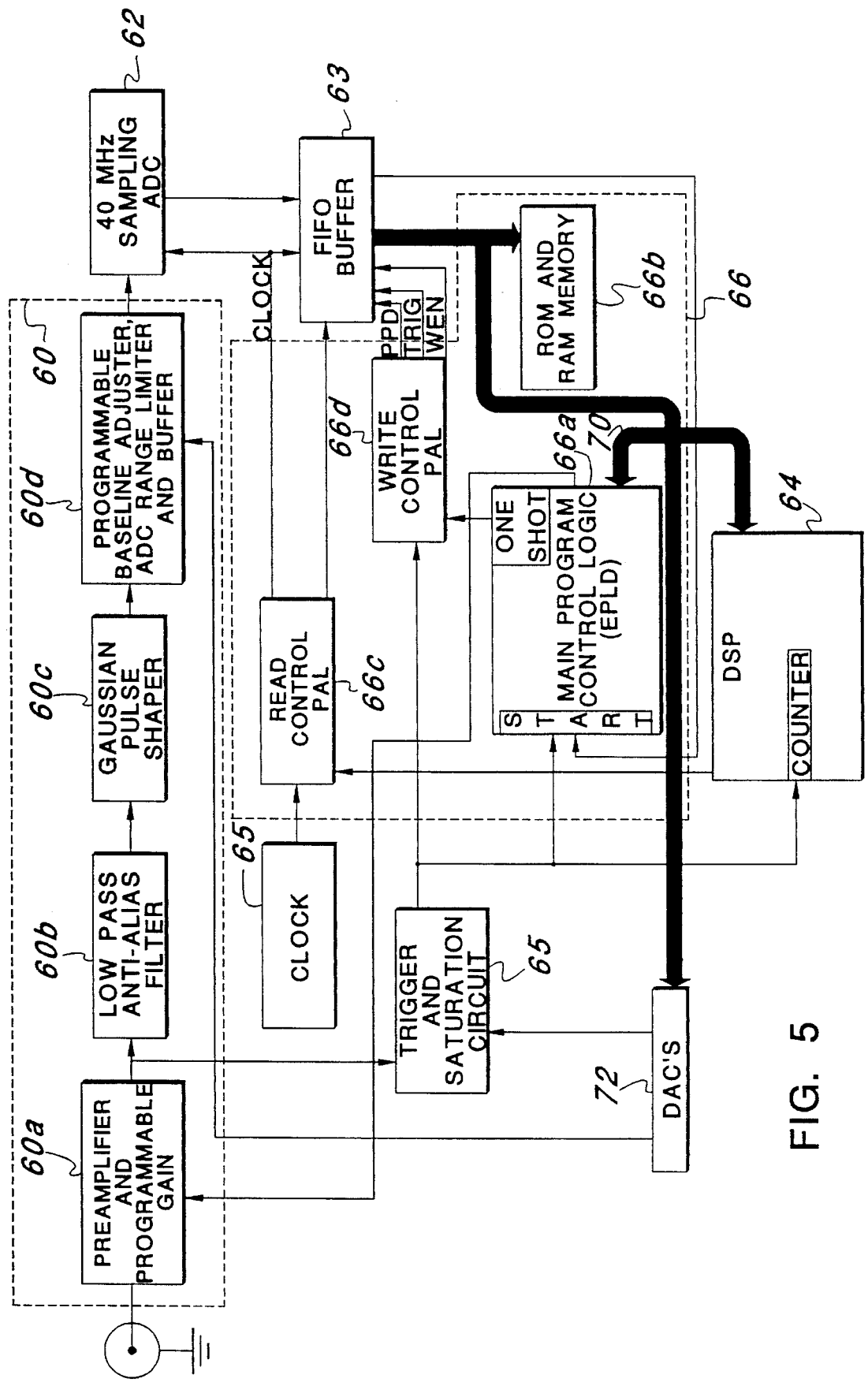
FIG. 5 is a detailed block diagram of the multi-channel analyzer of FIG. 4.

Appendix A contains an exemplary pulse processing routine for use in the multi-channel analyzer of FIG. 5.

Appendix B contains an exemplary baseline adjust routine for use in the multi-channel analyzer of FIG. 5.

Corresponding reference characters indicate corresponding components throughout the several views of the drawings.

DETAILED DESCRIPTION OF THE INVENTION

The following description of the presently contemplated best mode of practicing the invention is not to be taken in a limiting sense, but is made merely for the purpose of describing the general principles of the invention. The scope of the invention should be determined with reference to the claims.

Figure 1:
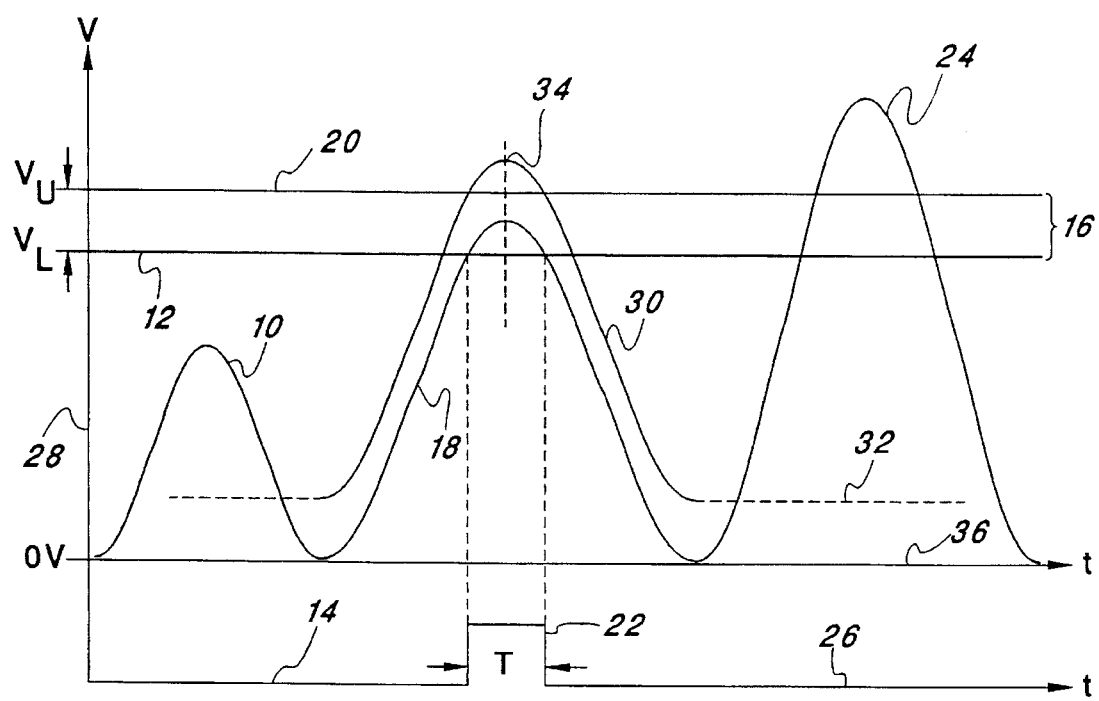
FIG. 1 is a graph of a sample input to and a sample output from a voltage window analyzer, wherein time is shown on the horizontal (abscissa) axes and voltage is shown on the vertical (ordinate) axis, and wherein the problem of baseline shift is illustrated.
Figure 2:
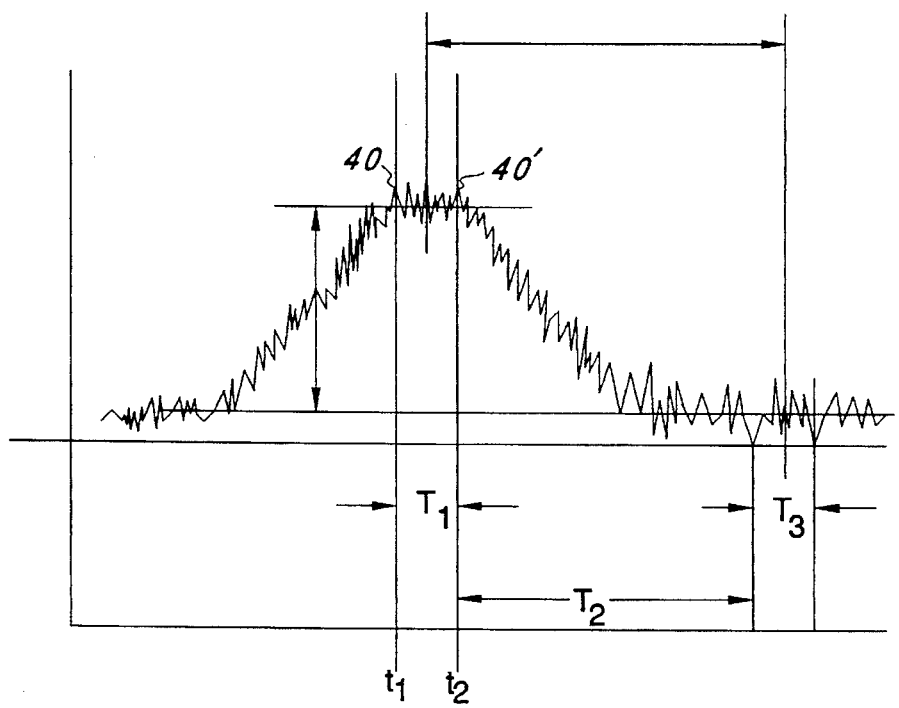
FIG. 2 is a graph of a sample input to the voltage window analyzer, wherein amplitude is represented on the vertical axis and time is represented on the horizontal axis, and wherein the problem of noise that is present on a detector signal is illustrated.
Figure 3:
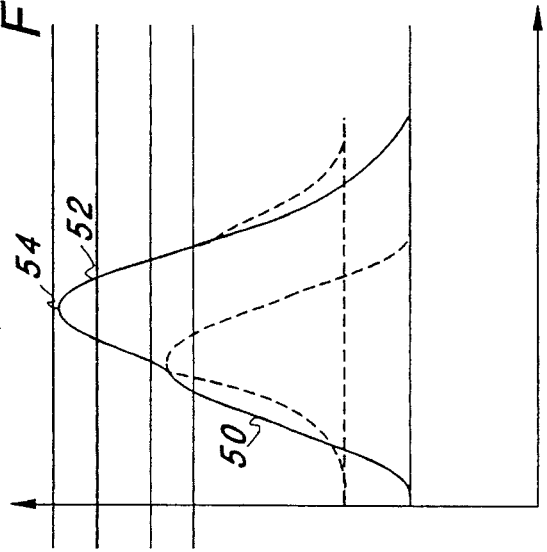
FIG. 3 is a graph of a sample input to the voltage window analyzer, wherein amplitude is represented on the vertical axis and time is represented on the horizontal axis, and wherein the problem of pulse pileup is illustrated.

FIGS. 1–3 have been previously described in the Background section of this patent document.

Figure 4:
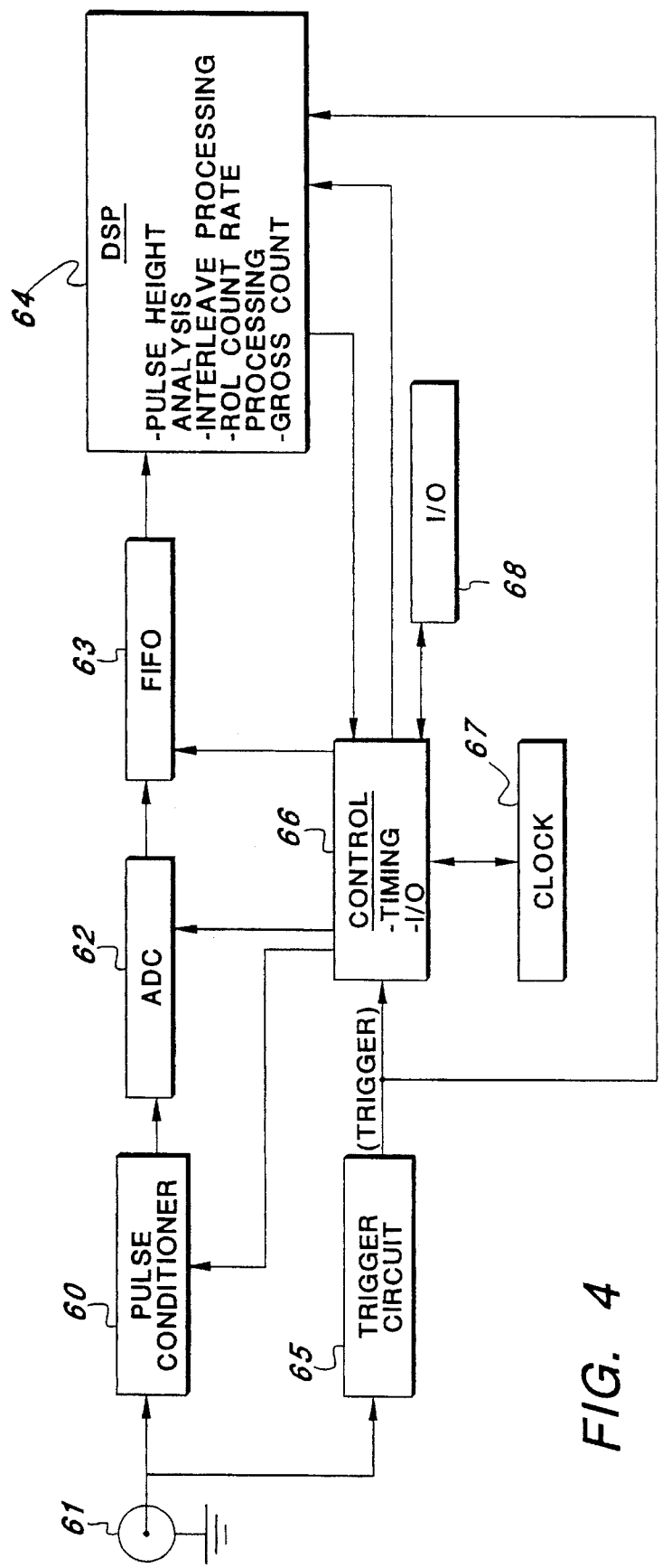
FIG. 4 is a block diagram of a multi-channel analyzer made in accordance with one embodiment of the present invention that addresses the problems illustrated in FIGS. 1, 2 and 3.

Referring to FIG. 4, a block diagram is shown of a multi-channel analyzer made in accordance with one embodiment of the present invention. AS seen in FIG. 4, a pulse conditioner 60 receives electrical pulses that are generated by a scintillation counter (not shown) and transmitted via a suitable electrical connector 61, such as a BNC-type or F-type connector. The pulse conditioner 60 filters and shapes the electrical signal so as to generate a Gaussian-shaped signal (or symmetrical signal) in response to the electrical signal. In addition, the pulse conditioner 60 performs baseline adjustment on the electrical signal. Such baseline adjustment includes adjusting Gaussian-shaped pulses within the Gaussian-shaped signal so as to utilize at least 95%, preferably at least 99.5%, of the dynamic range of an analog to digital converter 62. The dynamic range can be from −2.0 volts to +2.0 volts, and the maximum height of the Gaussian-shaped pulses (baseline to peak) can be positioned by the pulse conditioner 60 to be from −1.75 volts to +1.75 volts. Furthermore, such baseline adjustment assures that the baseline of the Gaussian-shaped pulses is substantially constant, i.e., falls within a prescribed range of voltages, e.g., between −1.8 volts and 1.7 volts, approximately centered around the desired baseline of −1.75 volts. In this way the present invention performs baseline adjustments and thereby accounts and adjusts for baseline drift in the electrical signal.

The analog to digital converter (ADC) 62 is coupled to the pulse conditioner 60. The ADC 62 digitizes the Gaussian-shaped signal, and generates a pulse data signal in response thereto. The ADC 62 preferably has a 40 MHz sampling rate, and the pulse data signal consists of a plurality of binary words that are indicative of sampled amplitudes of the Gaussian-shaped signal. Such analog to digital converters are known in the art.

Coupled to the ADC 62 is a first-in-first-out (FIFO) buffer 63 that receives and stores the samples of the pulse data signal. The FIFO buffer 63 is coupled to a digital signal processor (DSP) 64 that performs pulse height analysis on the pulse data signal, as well as performing interleave processing, region of interest (ROI) count rate processing, and gross count rate processing, all of which are explained more completely below.

A trigger circuit 65 is also coupled to the scintillation counter and receives the electrical pulses from the scintillation counter via the electrical connector 61. The trigger circuit 65 generates a trigger pulse within a trigger signal in response to each of the electrical pulses. The trigger circuit 65 consists of a differentiator circuit 65 that senses rising edges in the electrical signal and produces the trigger pulse in response to the rising edges. The trigger circuit 65 detects the electrical pulses in the electrical signal much faster than the digital signal processor 64 would be able to detect Gaussian-shaped pulses within the Gaussian-shaped signal, and therefore, is used to detect and account for pulse pileup as described below. The trigger signal is also used by the digital signal processor 64 to perform gross count rate processing, i.e., to generate a gross count rate.

A control circuit 66 is coupled to the trigger circuit 65 and receives the trigger signal therefrom. The control circuit 66 is further coupled to the pulse conditioner 60, the ADC 62, the FIFO buffer 63 and the digital signal processor 64. The control circuit 66 is used to control timing between the pulse conditioner 60, the ADC 62, the FIFO buffer 63 and the digital signal processor 64. Also coupled to the control circuit is a clock circuit 67 that generates a clock signal that is used, along with the trigger signal, to control the timing. Finally, an input/output circuit 68 is coupled to the control circuit 66 and is used to perform input/output functions such as displaying, printing or storing a histogram of the pulse heights (pulse energies) of the electrical pulses received into each of a plurality of channels during a prescribed time period. The input/output circuit 68 also displays, prints or stores a count rate within a region of interest (region of interest (ROI) count rate) and/or a gross count rate.

The trigger circuit 65 is also coupled to the digital signal processor 64 and is used by the digital signal processor 64 to perform pulse pileup detection, gross and ROI count rate processing, and interleave processing.

Referring next to FIG. 5, a detailed block diagram is shown of the multi-channel analyzer of FIG. 4.

As seen in FIG. 5, the pulse conditioner 60 includes a programmable gain preamplifier 60a that receives and amplifies the electrical pulse from the scintillation counter (in response to a programmable gain signal received from the digital signal processor 64 via a data bus 70). The gain of the programmable gain preamplifier 60a can be adjusted so as to calibrate the programmable gain preamplifier 60a to maximize use of the dynamic range of the ADC 62.

Coupled to the preamplifier 60a is a low pass filter 60b that filters the electrical signal, so as to prevent aliasing when the electrical signal is digitized by the ADC 62. Coupled to the low pass filter 50b is a Gaussian pulse shaper 60c that shapes the electrical pulses within the electrical signal into the Gaussian-shaped pulses within the Gaussian-shaped signal.

Finally, a programmable baseline shifter 60d is coupled to the Gaussian pulse shaper 60c. The programmable baseline shifter 60d shifts a baseline of the Gaussian-shaped pulses in response to a baseline adjust signal (received from the digital signal processor 64 via the data bus 70). The programmable baseline adjuster 60d, performs the baseline adjustment functions described above: (1) maximizing dynamic range (along with the programmable gain amplifier 60a); and (2) automatically stabilizing baseline to within a prescribed range of voltages.

Also shown in FIG. 5 are the ADC 62, the FIFO buffer 63, the digital signal processor 64, and trigger circuit 65 mentioned above.

The digital signal processor 64 is preferably a 32 bit 33 MHz floating point digital signal processor such as Part No. TMS320C31 available from Texas Instruments of Houston, Tex. Other types of processors may, of course, also be used. The digital signal processor 64 preferably includes a 32 bit counter that is used to maintain the gross pulse count of all pulses including overrange and piled up pulses. The gross pulse count is used in calculating a pulse processing efficiency (PPE), described below.

The control circuit 66 includes an erasable programmable logic device (EPLD) 66a such as Part No. CY7C341 available from Cypress Semiconductor of San Jose, Calif. The EPLD 66a is coupled to the programmable gain preamplifier 60a, the trigger circuit 65, the digital signal processor 64, the FIFO buffer 63, and the data bus 70.

The data bus 70 is coupled between the FIFO buffer 63, the digital signal processor 64, a digital to analog converter (DAC) 72 and a memory device 66b, which is part of the control circuit 66.

The control circuit 66 further includes a read control PAL (programmable array logic) 66c and a write control PAL (programmable array logic) 66d. The read control PAL 62b is coupled to the clock circuit 67, the digital signal processor 64, the EPLD 66a, the ADC 62 and the FIFO buffer 63, and is used to control the timing of FIFO buffer read functions.

The write control PAL 66d is coupled to the trigger circuit 65, the EPLD 66a and the FIFO buffer 63, and is used to control the timing of FIFO buffer write functions. The write control PAL 66d also generates the trigger and pulse-pileup flag bits described hereinbelow.

As mentioned above, the pulse conditioner 60 consists of the programmable gain preamplifier 60a, the low pass filter 60b, the Gaussian pulse shaper 60a, and the programmable baseline adjuster 60d (or shifter).

The low pass filter 60b eliminates high frequency noise distortion and the aliasing effects that are introduced, e.g., by the digitizing or sampling of the ADC 62. The ADC 62 samples at a sampling rate of 40 MHz, and therefore the electrical signal from the scintillation counter needs to be band limited to 20 MHz to prevent aliasing (as modeled by Nyquist's sampling theorem). The low pass filter 60b attenuates a 20 MHz signal more than −60 db ($\frac{1}{1000}$).

The Gaussian pulse shaper 60c is a series of integrators and differentiators that increases the rise time and decreases the fall time of the electrical pulses thereby generating the Gaussian-shaped pulses. The Gaussian-shaped pulses have improved signal-to-noise ratio over that of the electrical pulses. In addition, The Gaussian-shaped pulses excursion characteristics allow improved baseline determination, which in turn increases the accuracy of pulse height analysis.

In response to the baseline adjust signal from the digital signal processor 64, the programmable baseline adjuster 60d (or level shifter) dynamically shifts the Gaussian-shaped pulses' baselines to be close to the ADC's zero input value. Adjusting the base of the Gaussian-shaped pulses to start near, but not at, the bottom of the ADC's scale maximizes the use of the ADC's dynamic range, while permitting accurate pulse height detection and baseline adjustment in the event the baseline drops, i.e., drifts lower. The level-shifted Gaussian-shaped pulses are presented to the ADC 62 for conversion (i.e., digitizing).

The ADC 62 has a 10-bit binary output which divides its full scale into 1024 increments. The level-shifted Gaussian-shaped pulses are sampled by the ADC 62 at a 40 MHz rate. This high sampling rate is sufficient to provide good sampled outlines of the Gaussian-shaped pulses. The ADC 62 generates the pulse data signal in response to digitizing the Gaussian-shapes pulses.

The digital signal processor 64 analyzes the pulse data signal by performing forward and reverse smoothing functions to accurately determine the pulses' heights. Such forward and reverse smoothing functions are performed in response to a smoothing routine, which is explained more fully below in relation to FIG. 9.

Figure 7:
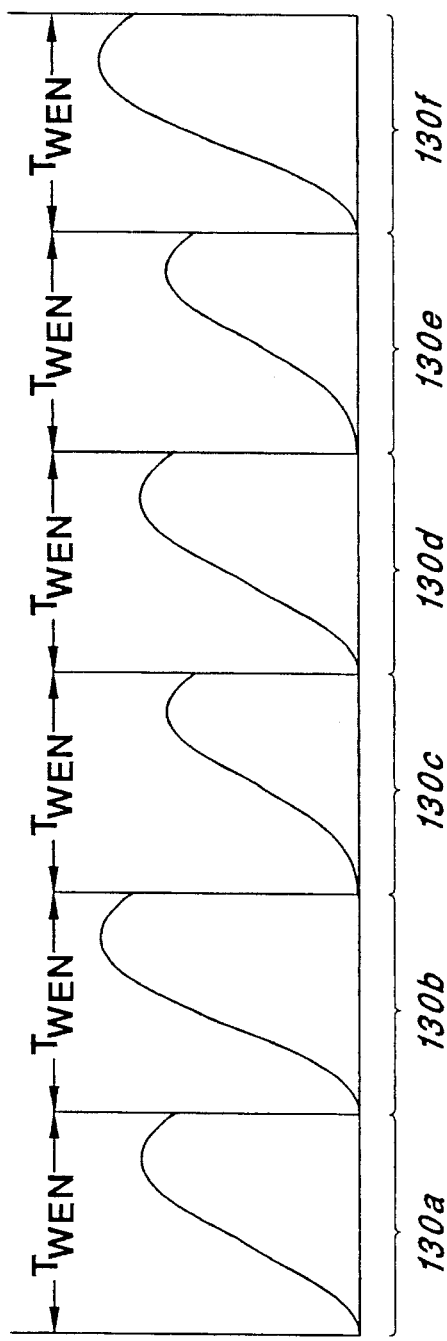
FIG. 7 is a graphical representation of pulse fragments that are stored within a FIFO buffer of the multi-channel analyzer of FIG. 5.
Figure 8:
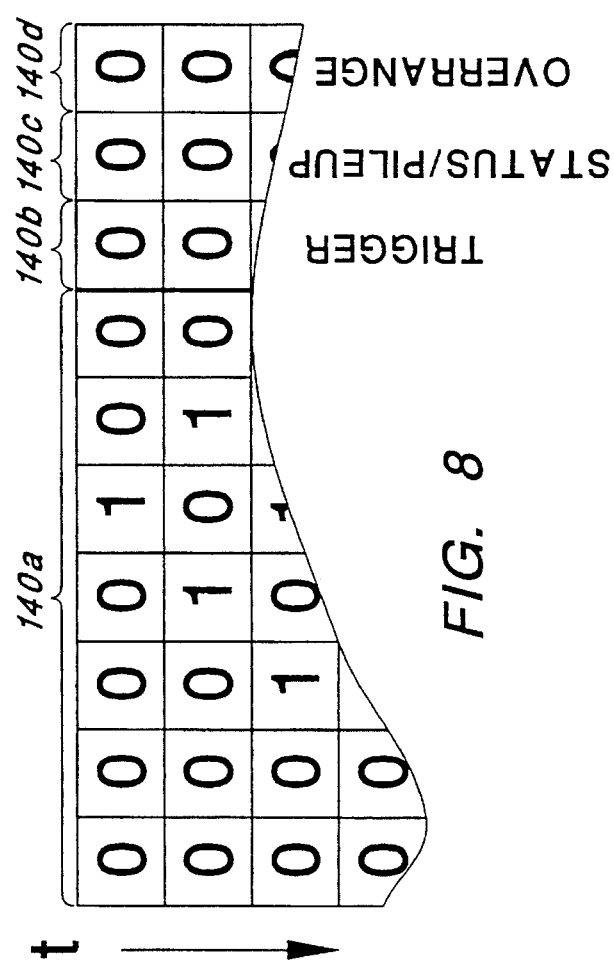
FIG. 8 is a map showing data and flags that are stored within the FIFO buffer of the multi-channel analyzer of FIG. 5.

The samples taken by the ADC 62 for each of the Gaussian-shaped pulses are sequentially stored in the FIFO buffer 63. The ADC 62 continually performs conversions and presents the pulse data signal to the FIFO buffer 63. However, only useful pulse height information (or data) is allowed by the write control PAL 66d into the FIFO buffer 63. Such useful pulse data falls within a timing bracket from the start of the pulse to just passed the its peak. Examples of useful pulse data (or pulse fragments) are shown in FIGS. 7 and 8. The write control PAL 66d creates this timing bracket by monitoring the trigger signal, and generating a write enable (WEN) signal as described below.

Prior to conditioning by the pulse conditioner 60, the electrical pulses have a fast rise time and a slow decay time. The trigger circuit 65 (or differentiator circuit), which senses the rising edge of the electrical pulses, is used both to detect the existence of the electrical pulses and to mark their beginnings. The differentiator circuit 65 generates the trigger pulse in response to each electrical pulse that exceeds a lower discriminator level, which is selected to eliminate the possibility that the trigger pulse will be generated in response to noise that is present in the detector signal. The differentiator circuit 65 produces the trigger signal that contains the trigger pulses.

The trigger signal is used to perform two system functions: (1) the trigger pulses are counted by the digital signal processor 64 to provide a total gross count of the pulses entering the MCA above the lower discriminator level (or "trigger level"); and (2) the trigger circuit 65 initiates two timed output signals, a pulse sample time (PST) signal and a baseline restore time (BLR) signal. These two system functions are explained more fully below.

The two timed output signals are used to control data recording by the FIFO buffer 63 and to prevent distorted pulses due to "pulse pileup" from corrupting the MCA's database of pulse heights (described below).

The PST signal is "asserted" during a pulse sample time, e.g., 1 μs and is used to generate the WEN signal that enables the FIFO buffer 63 to record the useful pulse height information from the beginning of the conditioned pulse (Gaussian-shaped pulse) to just past its peak. The propagation delay of the electrical pulse (detector pulse) as it passes through the pulse conditioner 60 from the scintillation counter ensures that the WEN signal enables the FIFO buffer 63 in time to record the entire useful pulse height information from baseline to just past the peak (i.e., the pulse fragment).

The duration of the PST signal (which is approximately the same as the duration of the WEN signal) is automatically adjusted by a software control routine based on characteristics of the detector pulse. The software control routine dynamically adjusts the pulse sample time (PST) and the baseline restore (BLR) time to an optimum value based on the rise times of the electrical pulses, which vary from detector to detector. This same function could also, if desired, be carried out by a dedicated hardware circuit. In order to avoid manually selecting the pulse sample time (PST) and the baseline restore (BLR) time for each particular scintillation detector with which the teachings of the present invention may be utilized, the PST is adjusted to sample to just past the peak, e.g., from the baseline of the pulse to the peak, plus an additional 10% (i.e., the time from baseline to peak plus 10%). As mentioned herein, the BLR time is adjusted based on the PST, which is appropriate since the rise and fall times of the electrical pulse are correlated (due to their Gaussian shape). The pulse fragments, read from the FIFO buffer 63 are integrated to find their peak value. When the peak value is found, a time index is recorded by the digital signal processor 64 and used to determine an average peak time index during each of the 600 ms processing intervals. The average peak time index is filtered using a recursive software filter as follows:

$$\text{filter\_avg\_peak\_time} = k \cdot \text{avg\_peak-time} + (1-k) \cdot \text{filtered\_avg\_peak\_time (prev)},$$

wherein filter_avg_peak_time is a filtered average peak time index, avg_peak_time is the average peak time index determined during the 600 ms processing interval immediately preceeding the determination of the filtered average peak time index, filtered_avg_peak_time (prev) is the filtered average peak time index determined during a previous iteration of the recursive software filter, and k is a weighting factor that is used to determine the relative weight given to avg_peak_time and filtered_avg_peak_time (prev) in determining the filter_avg_peak_time. The weighting factor k can be preselected for the particular detector used with the present invention, or can be dynamically adjusted to have greater in response to a "dynamic" average peak time index for lessor in response to a relatively "static" average peak time index.

The pulse sample time (PST) is calculated from the filtered average peak time index by scaling up the filtered average peak time index by approximately 10%. This insures that the WEN signal is long enough to insure that the FIFO is enabled long enough to capture the peaks of the electrical pulses. In the event the WEN signal is too short, and therefore "cuts off" the electrical pulse before it reaches its peak, the filtered average peak time index will be approximately equal to the PST, and therefore the next PST will be 10% longer than the previous PST. This increases the WEN time until the peaks of the electrical pulses are captured. Similarly, if the WEN time is too long, thereby enabling the FIFO too long and capturing more of the electrical pulses than is necessary to accurately determine pulse height, the peak will occur long before the end of the PST. As a result, the filtered average peak time index will decrease slowly until it reaches a point that is 10% below the peak, thereby minimizing the PST and improving processing efficiency. The duration of the PST is preferably displayed using a display device that is part of the input/output circuit 68 (FIG. 4).

The BLR signal approximates when the Gaussian-shaped pulse has restored to approximately the baseline, i.e., near the ADC's "zero." If an electrical pulse occurs after the baseline has restored, i.e., if the BLR signal is "asserted," the pulse fragment corresponding to the electrical pulse is saved in the FIFO buffer 63 during the PST. If an electrical pulse occurs while the baseline is not restored due to the influence of a previous pulse, i.e., while the BLR signal is "not asserted," the pulse fragment corresponding to that pulse is not allowed to enter the FIFO buffer 63. The BLR signal remains "not asserted" for a period of time exceeding the time necessary for the baseline of the Gaussian-shaped pulses to substantially restore.

The pulse height is found by calculating the difference between the Gaussian-shaped pulse's peak and the start of the pulse, i.e., where the pulse is at its baseline. Thus, if the Gaussian-shaped pulse does not start from near the baseline, distortion may be introduced in the difference calculation. In this way, the BLR signal ensures that the first ADC samples of each Gaussian-shaped pulse that are entered into the FIFO buffer 63 start approximately at the baseline of the Gaussian-shaped pulses, thereby minimizing the effects of pulse pileup.

Note that the difference method, i.e., calculating the difference in time between the start time of the Gaussian-shaped pulse and the time it reaches its peak (as determined by the smoothing routine described in connection with FIG. 9) eliminates small shifts from the baseline. Thus, the baseline need only be nearly restored when the BLR time expires, because small deviations from the baseline are compensated for through the difference method.

The baseline is considered to be restored if the BLR signal is "asserted" when, as a minimum, the BLR time has elapsed since the last electrical pulse (as indicated by the trigger signal). The BLR time is a multiple of the PST time (preferably 7×), and therefore is also automatically controlled. BLR time is preferably displayed on the display device.

The FIFO buffer 63 stores concatenated ADC samples consisting of the pulse fragments for each Gaussian-shaped pulse starting at the baseline and ending just past the peak, as determined by the PST. This allows for efficient processing since only useful data for extracting pulse information is saved in the FIFO buffer 63. In alternative embodiments, all of the pulse data signal is stored in the FIFO buffer 63, or an alternative pulse fragment is stored consisting of portions of the pulse data signal corresponding the Gaussian-shapes pulses from just before their peaks to where they return to their baselines.

All of the pulse fragments, may not be useful since some of the pulse fragments may be "piled-up". This happens when one Gaussian-shaped pulse occurs during the PST of another Gaussian-shaped pulse. Since the PST time allows sampling from the Gaussian-shaped pulse's baseline to just past its peak, it is very likely that the second pulse will affect the pulse height calculation of the first pulse. Thus, the pulse height of the piled up pulse fragment stored in the FIFO buffer 63 during the PST is meaningless. In order to signal the digital signal processor 64 to discard this pulse data, the pulse pileup flag bit is saved along with the ADC samples. The pulse pileup flag bit indicates that the pulse fragment for a particular Gaussian-shaped pulse is invalid. The pulse pileup flag bit is generated by the write control PAL 66d in response to the detection of a second "trigger" pulse during the PST.

Since the trigger circuit 65 is a high speed differentiator circuit, electrical pulses that are very closely piled-up can be detected (approximately within 100 ns of one another) by the trigger circuit 65. Only an extremely small percentage of pulses will occur within 100 ns of each other, thus contributing a negligible pulse pileup error.

It should be noted that the BLR time and the pulse pileup flag bit are two separate ways of detecting the problem of pulse pile-up. The BLR time, however, prevents the affected pulse fragment from being stored in the FIFO buffer 63 (because it is distorted by a previous pulse), whereas the pulse pileup flag bit causes an already stored pulse fragment to be discarded because it is distorted by a subsequent pulse.

Another status flag bit that is saved in the FIFO buffer 63 along with the pulse pileup flag bit, is a trigger flag bit, which is used by the digital signal processor 64 to determine the beginning and ending of each pulse fragment within the FIFO buffer 63. The trigger flag bit is stored in response to the trigger pulses within the trigger signal.

The pulse fragments, and pulse pileup and trigger flag bits in the FIFO buffer 63 are sequentially retrieved and processed by the digital signal processor 64. The digital signal processor 64 interrogates the trigger flag bit to locate the beginning and ending of each pulse fragment in the FIFO buffer 63 and interrogates the pulse pileup flag but to determine if the pulse fragment is piled up.

A further status flag bit, an overrange flag bit, is also stored with each ADC sample and is set to "asserted" by the ADC 62 in response to a Gaussian-shaped pulse that is outside the ADC's dynamic range. If the ADC samples within a pulse fragment are valid, i.e., not piled up or overranged, the difference is taken between the pulse's peak and the pulse's baseline, as determined by the smoothing routine described below in reference with FIG. 9.

As mentioned above, the difference method eliminates the effect of small DC or low frequency shifts in the baseline that may not be fully corrected by the programmable baseline shifter 60d. Eliminating these small shifts has a significant effect on the Full-Width Half Max (FWHM) or the "narrowness" of the multi-channel analyzer's histogram peaks.

The calculated difference between the peak and the baseline of each pulse is the pulse height. In operation, the pulse height is used by the digital signal processor 64 to point to one of a plurality of memory locations within the memory device 66b to be incremented. The memory locations are each associated with a channel or "window," which are each associated with a range of particle energies. As the heights of the pulses are utilized to increment the memory locations, a "database" consisting of the memory locations is maintained in the memory device 66b, and is utilized to create a histogram on the display device.

In this way, the multi-channel analyzer utilizes only baseline restored, non-piled-up, non-overrange, noise free pulses, which can be processed at count rates up to 10E7 counts per minute (cpm), to perform pulse height analysis on the electrical pulses within the electrical signal. The MCA uses such pulses to generate a database of pulse heights, which is used to generate a histogram of pulse heights on the display device.

Because the histogram peaks do not shift at high count rates, due to errors caused, e.g., by pulse pileup, the MCA of the present invention is very useful for on-line monitoring of specific isotopes within a region-of-interest (ROI), i.e., a range of particle energies.

Figure 6:
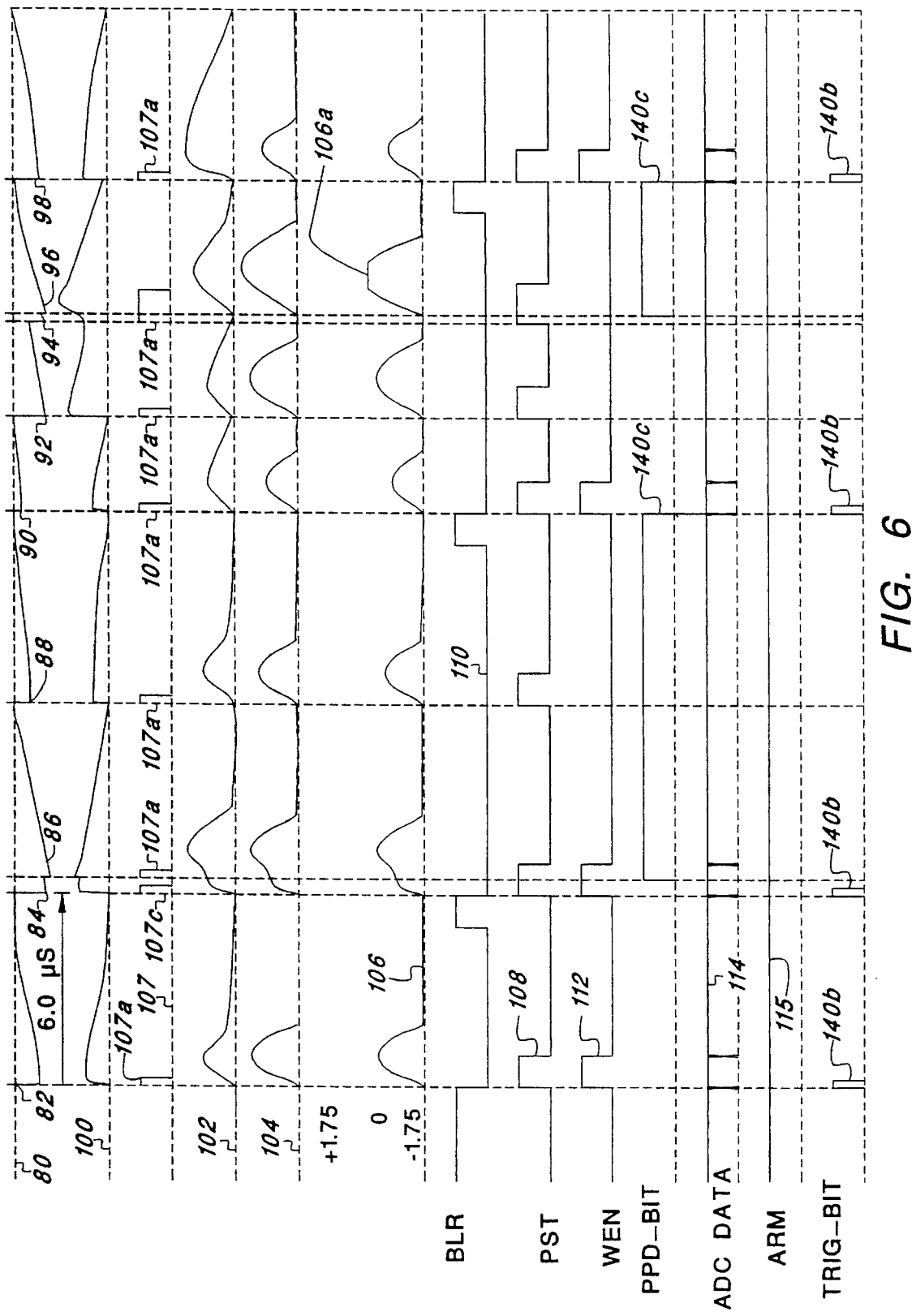
FIG. 6 is a timing diagram illustrating the various signals that are utilized within the multi-channel analyzer of FIG. 5.

Referring next to FIG. 6, a timing diagram is shown illustrating the various signals that are utilized within the multi-channel analyzer.

The electrical signal 80 is illustrated, and several exemplary electrical pulses 82 through 98 of the type typically generated by a scintillation counter can be seen. Several of the pulses 82 through 98 shown are "piled up," i.e., 84 with 86 and 88, and 90 with 92, 94, and 96.

Also shown is the electrical signal having been amplified by the programmable gain preamplifier 60a, i.e., a detector signal 100. As can be seen the detector signal 100 is slightly slower than the electrical signal 80 and is inverted. The detector signal 100 is filtered by the low pass filter 60b. The low pass filter generates a filtered detector signal 102 that is significantly slower and smoother than the electrical signal 80.

The filtered detector signal 102 is passed into the Gaussian pulse shaper 60c, and the Gaussian-shaped signal 104 is generated in response thereto. The Gaussian-shaped signal 104 is passed to the programmable baseline adjuster 60d.

Because the preferred ADC 62 has a bipolar input, with an input range from −2.00 volts to +2.00 volts. The programmable baseline adjuster 60d, which is preferably a summing amplifier, is used to shift down the Gaussian-shaped signal 104 by approximately 1.75 volts. A control input to the programmable baseline adjuster 60d is coupled to the digital signal processor 64 via the DAC 72. Through the baseline adjust signal from the digital signal processor 64, the digital signal processor 64 dynamically adjusts the baseline (or offset) of the Gaussian-shaped signal 104 to adjust for drift (or shift) in the baseline and so as to maximize use of the ADC's dynamic range. The baseline adjust signal is generated by the digital signal processor 64 in response to a baseline adjust routine, an example of which is shown in Appendix B. A baseline-adjusted Gaussian-shaped signal 106 from the baseline adjuster 60d is shown.

Zener diodes are preferably used within the programmable baseline adjustor 600 to clip or limit the output of the programmable baseline adjuster 60d. In order to accurately clip the Gaussian-shaped signal 104 at ±1.75 volts, just 0.25 volts from the dynamic limits of the ADC 62 (which are ±2.0 volts), the programmable baseline adjuster 60d has an internal dynamic range of −10 volts to +10 volts, and a corresponding desired clipped signal range of −8.25 volts to +8.25 volts. This internal dynamic range is scaled down ×5 by a range limiting amplifier that is a part of the programmable baseline adjuster 60d. Such clipping and scaling is done in order to facilitate the accurate positioning of the baseline near the lower dynamic limit of the ADC 62, i.e., −2.0 volts. Such clipping, after the scaling is performed, results in a signal that is limited to a range of ±1.75 volts. A clipped Gaussian-shaped pulse 106a is illustrated in the Gaussian-shaped signal. After being limited by the Zener Diodes, the Gaussian-shaped signal is passed into the ADC 62.

The "trigger" pulse 107a within the trigger signal 107 is generated in response to each of the electrical pulses and consists of a very short duration pulse, e.g., about 1 μS. The trigger signal is passed to the control circuit 66 and is used by the write control PAL 66d to initiate the PST. The PST is evident in a PST signal 108, which remains in an "asserted" state during the PST and then returns to a "not asserted" state. As shown in FIG. 6, the PST signal becomes asserted in response to several of the electrical pulses 82,84,88,90, 92,94,98. Likewise, the BLR time is initiated by the trigger signal, and is evident in a BLR signal 110. The BLR signal becomes "not asserted" in response to several of the electrical pulses 82,84,90,98. In addition, the BLR time is reinitiated in response to several others of the electrical pulses 86,88,92,94,96. A write enable (WEN) time, which has the same duration as the PST, is manifested in the write enable (WEN) signal 112, which is initiated in response to several of the electrical pulses 82,84,90,98. The PST signal 108 and the WEN signal 112 are non-retriggerable, that is, they are not restarted in the event another trigger pulse 107a within the trigger signal 107 is generated before the PST or WEN time have terminated. A programmable, non-retriggerable one-shot triggered by the trigger pulses 107a within the trigger signal 107 can be used to generate the PST signal 108 and WEN signal 112. In contrast, the BLR signal 110 is retriggerable, meaning that the BLR signal 110 remains "not asserted" until there have been no trigger pulses 107a in the trigger signal 107 for at least the BLR time. In other words, the BLR time restarts or retriggers after each trigger pulse 107a. A programmable retriggerable one-shot triggered by trigger pulses 107a within the trigger signal 107 can be used to generate the BLR signal 110.

The BLR time can be approximately 5.4 μS and is selected to allow the Gaussian-shaped signal 104 to return to near its baseline after the PST has expired.

The WEN signal 112 is generated by the write control PAL 66d within the control circuit 66 and is passed to the FIFO buffer 63. The WEN signal 112 is used by the FIFO buffer 63 to enable the FIFO buffer 63 to store the pulse data signal 114 generated by the ADC 62. When the WEN signal 112 is "asserted", the FIFO buffer 63 stores or records the pulse data signal 114 being generated by the ADC 62, and when the WEN signal 112 is not asserted, the FIFO buffer 63 does not store, i.e., ignores or discards, the pulse data signal 114. The WEN signal 112 becomes "asserted" when the MCA is "armed", as is manifest in an "arm" signal 115; the baseline is restored, i.e., the BLR signal 110 is "asserted"; and a trigger pulse 107a is received in the trigger signal 107. Once "asserted" the WEN signal 112 remains asserted for the PST, which is selected to allow the FIFO buffer 63 to store the pulse data signal 114 until just past the peak of the Gaussian-shaped signal 104.

An example of the pulse fragments 130 that are stored in the FIFO buffer 63 (shown in analog form for illustration purposes) is shown in FIG. 7. As can be seen, only the first part of each Gaussian-shaped pulse from its baseline until just past its peak is stored. The stored pulse fragments 130a through 130f correspond to the pulse data signal generated during the WEN time $T_{WEN}$, i.e., the periods of time during which the WEN signal 112 (FIG. 6) is "asserted". While storage of only such pulse fragments 130a through 130f is not necessary to practice the present invention, the pulse fragments 130a through 130f are all of the pulse data signal 114 that is needed to perform pulse height analysis. Thus, faster processing and a smaller size of the FIFO buffer 63 can be achieved by storing only the pulse fragments 130a through 130f.

At the same time the FIFO buffer 63 is storing pulse fragments, the digital signal processor 64 retrieves the pulse fragments 130a through 130f from the FIFO buffer 63, and begins the pulse height analysis. As illustrated in FIG. 8, the pulse data signal 114 is stored as a series of ADC samples 104a consisting of, e.g., seven bit words, along with the three status flag bits 140b through 140d. The status flag bits 140b through 140d are stored along with each ADC sample 140a in the series. As mentioned above, the trigger flag bit 140b is asserted in response to the trigger pulse 107a, and therefore marks the ADC sample 140a, or first ADC samples 140a, in each of the pulse fragments 130a through 130f. The trigger flag bit 140b is used by the digital signal processor 64 to determine the location within the series of ADC samples 104a of the beginning and the ending of each of the pulse fragments 130a through 130f.

Also shown is the pulse pileup flag bit 140c. Because pulse pileup can occur after the beginning of the pulse fragment 130a trough 130f, but before the end of the WEN time, the pulse fragment 130a through 130f may be partially saved in the FIFO buffer 63 when pulse pileup is detected (in response to another trigger pulse 107a being detected before the PST has expired). In response to such trigger pulse 107a, the write control PAL 66d of the control circuit 66 generates the pulse pileup flag bit 140c (FIGS. 6 and 8) and passes it to the FIFO buffer 63 to be stored along with the ADC samples 140a. Subsequently, when the pulse pileup flag bit 140c is received by the digital signal processor 64, the ADC samples for the pulse fragment that contains the pulse pileup flag bit 140c are discarded (because the pulse height of the piled-up pulse fragment is indicative of a greater energy than that of either of the particles that caused the piled up pulses).

Figure 9:
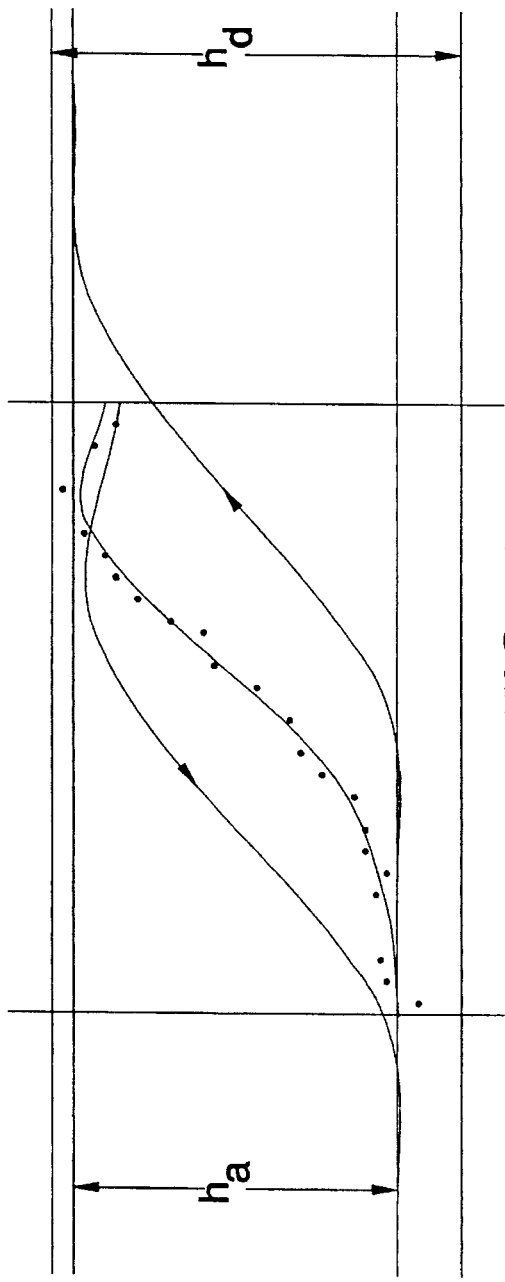
FIG. 9 is graph illustrating how a digital signal processor within the multi-channel analyzer of FIG. 5 determines the peak and baseline of the pulse fragments that are shown in FIG. 7.

Referring next to FIG. 9, a graph is shown that illustrates how the digital signal processor 64 within the multi-channel analyzer of FIG. 5 determines the peak and baseline of the pulse fragments that are shown in FIG. 7.

Both the peak and the baseline of the pulse fragments are filtered by a software filter in order to extract an accurate peak and baseline value. Individual samples are depicted as dots in FIG. 9, while a filtered peak and baseline, which are taken along forward and reverse filter passes, are depicted as respective curves with forward and reverse pointing arrows. Also shown is a representation of the actual electrical pulse, shown as a curve without an arrow.

A 7-tap finite impulse response (FIR) filter can be used for this purpose. The impulse response of the filter, or the filter coefficients used, have a distribution, or ratio, that is matched, or proportional, to the shape of the pulse fragments it is filtering. Thus, it is, in a sense, a matched filter. The samples near the peak of the pulse fragment, which are also used to control the PST, are shifted through the FIR filter. A resulting magnitude output is approximately the same as the peak, had it been determined in the absence of noise of other distortion. Thus, the location of the peak should be accurately indicated when the samples near the peak, having been shifted through the FIR filter, most closely match the ideal peak shape encoded into the impulse response of the FIR filter through the selection of filter coefficients. Note that this is true regardless of whether noise or distortion is present in the pulse fragments.

The baseline of the pulse fragments is also determined by shifting samples through the FIR filter in a manner similar to that described above for determining the peak. However, the lowest filtered output response corresponds to the baseline. Note however that the samples near the baseline do not cause a filtered output that corresponds to the impulse response of the FIR filter. Nonetheless, the FIR filter has the same filtering capability, or frequency response, and is linear and consistent from pulse fragment to pulse fragment. Because the filtering occurs only in response to samples that are near the peak and samples that are near the baseline, efficient processing, as well as effective filtering, is achieved.

Figure 10:
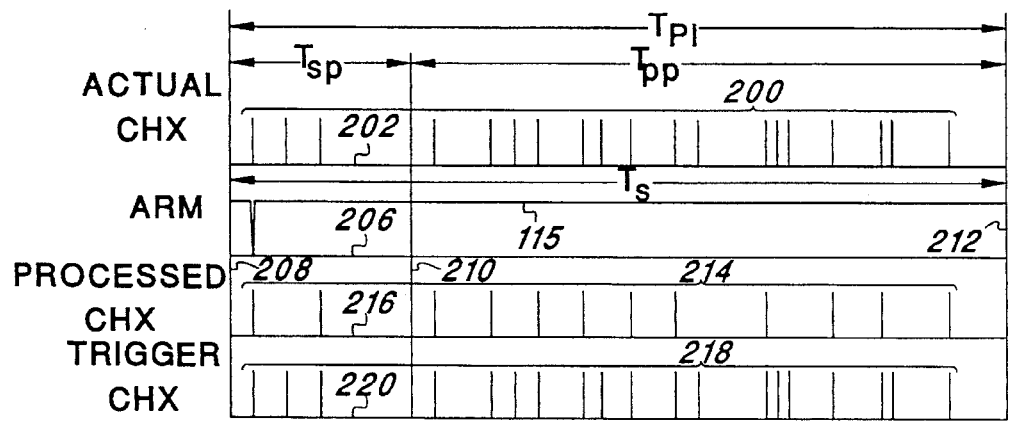
FIG. 10 is a timing diagram showing various signals that are used by the multi-channel analyzer of FIG. 5 when electrical pulses are received at a relatively low count rate.

Referring next to FIG. 10, a timing diagram is shown of various signals that are used by the multi-channel analyzer of FIG. 5 when electrical pulses are received at a relatively low count rate.

The MCA operates on a 600 ms processing interval $T_{PI}$. At the beginning of each processing interval $T_{PI}$, for a segment processing interval $T_{SP}$, of approximately 50 ms, the digital signal processor 64 is dedicated to perform segment processing, which includes hardware updates, count rate calculations, both gross count rate and ROI count rate, and control circuit interfacing including, e.g., updating screen displays on the display device. During the 50 ms the digital signal processor 64 is unable to extract and process pulse data from the FIFO buffer 63. At the end of the segment processing time $T_{SP}$, the digital signal processor 64 is free to begin processing the previously saved and newly saved pulse fragments stored in the FIFO buffer 63. Such processing occurs during a pulse processing time $T_{PP}$.

As shown in FIG. 10, actual electrical pulses 200 received from the scintillation counter are represented on a first horizontal axis 202, and an "arm" signal 204 is represented on a second horizontal axis 206. Whenever the MCA is armed, the arm signal is "asserted," and in response thereto the FIFO buffer 63 is able to receive the pulse fragments. A first period of time, referred to as a segment processing time $T_{SP}$, is shown as a pair of vertical axes 208, 210, and a second period of time, referred to as a pulse processing time $T_{PP}$, is shown as another pair of vertical axes. The segment processing time $T_{SP}$ is the time during which various housekeeping functions are carried out by the MCA. Near the beginning of the segment processing time $T_{SP}$, the digital signal processor 64 disarms the MCA by making the arm signal not-"asserted", and thereby disabling the FIFO buffer 63 from receiving any additional pulse fragments. The digital signal processor 64 then finishes processing the pulse fragments, if any, that are already in the FIFO buffer 63 waiting to be processed. After the FIFO buffer 63 is emptied, the MCA is rearmed (by "asserting" the arm signal), and pulse fragments are again accumulated in the FIFO buffer 63. The pulse fragments, are not, however, processed until the segment processing time $T_{SP}$ is over, at which time the pulse processing time $T_{PP}$ begins.

Note, because in FIG. 10 it is assumed that there are no pulse fragments in the FIFO buffer 63 when the segment processing time $T_{SP}$ begins, the period of time during which the MCA is disarmed is a very short period of time.

During the pulse processing time $T_{PP}$ the digital signal processor 64 processes pulses that have accumulated in the FIFO buffer 63 during the segment processing time $T_{SP}$ and/or that are received into the FIFO buffer 63 during the pulse processing time $T_{PP}$. The digital signal processor 64 reads each of the pulse fragments from the FIFO buffer 63 and processes the pulse fragments in order to determine their pulse heights. At the same time, additional pulse fragments, when received from the ADC 62, are stored in the FIFO buffer 63. After determining pulse heights, the digital signal processor 64 increments the location in the memory device 66b that corresponds to the determined pulse height or channel, and then reads the next pulse fragment from the FIFO buffer 63. An exemplary pulse processing routine is shown in Appendix A. The determination of pulse height is carried out as described above in connection with FIG. 9.

As shown also in FIG. 10, not every pulse fragment from the FIFO buffer 63 results in a valid pulse height determination. As mentioned above, the overrange flag bit and the pulse pileup flag bit may be set as the pulse fragment is stored into the FIFO buffer 63. The pulse may also be ignored because it occurred before the BLR time of a previous pulse had expired, i.e., because the WEN signal is not "asserted," as shown in FIG. 6. The overrange flag bit is generated by the ADC 62 and is stored in the FIFO buffer 63 in response to a Gaussian-shaped pulse having a peak that exceeds the maximum range of the ADC 62. Similarly, the pulse pileup flag bit is generated by the control circuit 66 in response to a second trigger pulse being received from the trigger circuit 65 during a PST that was initiated in response to a first trigger pulse. The pulse fragment heights that are counted in the memory device 66b, i.e., within channels or locations within the memory device that correspond to the pulse fragments' heights or particle energies, are shown on a third horizontal axis 216, and the trigger signal 218 is represented on a fourth horizontal axis 220.

Figure 11:
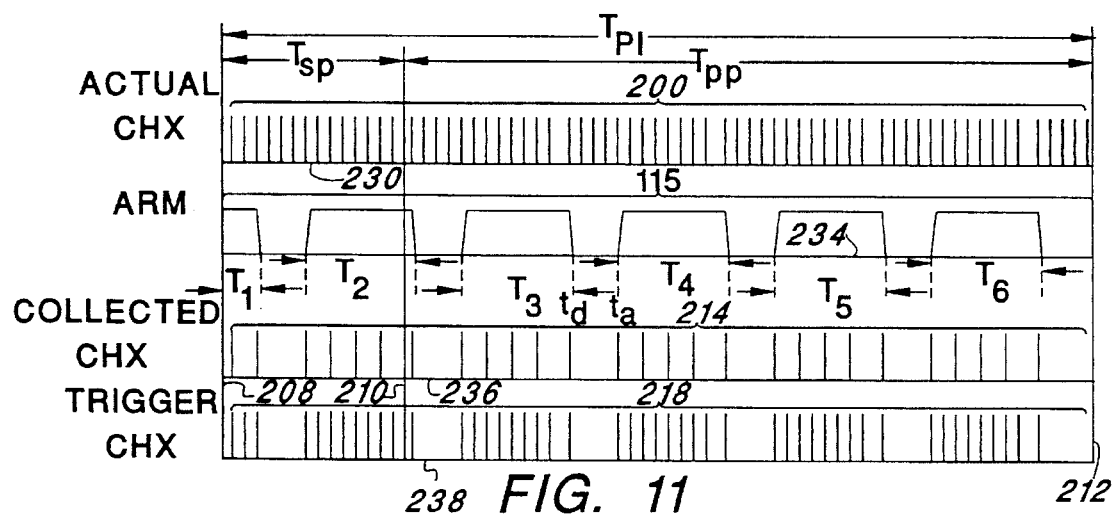
FIG. 11 is a timing diagram showing various signals that are used by the multi-channel analyzer of FIG. 5 when electrical pulses are received at a relatively high count rate.

Referring next to FIG. 11, a timing diagram is shown of various signals that are used by the multi-channel analyzer of FIG. 5 when electrical pulses are received at a relatively high count rate. Note that in practice, the electrical pulses 200 are random and not periodic. The electrical pulses 200 received from the scintillation counter are represented on a first horizontal axis 230, and the arm signal 115 is represented on a second horizontal axis 234. The segment processing time $T_{SP}$ is shown as a pair of vertical axes 208, 210, and the pulse processing time $T_{PP}$, is shown as another pair of vertical axes 210, 212. Near the beginning of the segment processing time $T_{SP}$, the digital signal processor 64 disarms the MCA by disabling the FIFO buffer 63 from receiving any additional pulse fragments, and finishes processing the pulse fragments that are already in the FIFO buffer 63. After the FIFO buffer 63 is emptied, the MCA is rearmed, and pulse fragments are accumulated in the FIFO buffer 63, but not processed, until the segment processing time $T_{SP}$ is over, at which time the pulse processing time $T_{PP}$ begins. If, however, the FIFO buffer 63 fills during the segment processing time $T_{SP}$, the pulse fragments collected in the FIFO buffer 63 during the $T_{SP}$ must be discarded, as explained herein.

Note, because, as depicted in FIG. 11, there are several pulse fragments in the FIFO buffer 63 when the segment processing time $T_{SP}$ begins, the period of time within the segment processing time $T_{SP}$ during which the MCA is disarmed is a relatively longer period of time than the very short period of time shown in FIG. 10.

During the pulse processing time $T_{PP}$ the digital signal processor 64 processes pulses that have accumulated in the FIFO buffer 63 during the segment processing time and/or that are received into the FIFO buffer 63 during the sample time. The digital signal processor 64 reads each of the pulse fragments from the FIFO buffer 63 and processes the pulse fragments in order to determine their pulse heights. At the same time, additional pulse fragments are stored in the FIFO buffer 63.

Because, however, the pulses are received at the relatively high count rate, e.g., 200,000 cpm, the digital signal processor 64 is unable to process the pulse fragments as fast or faster than they are stored in the FIFO buffer 63. As a result, the FIFO buffer 63 begins to fill up, and in response to such filling generates an "almost full" signal when the FIFO buffer 63 is almost full, e.g., ⅞ full. The almost full signal signals the MCA to finish storing the current pulse fragment, and to disarm at, e.g., time $t_d$. After the MCA disarms, the digital signal processor processes 64 all of the pulse fragments in the FIFO buffer 63, and then instructs the MCA to rearm at, e.g., time $t_a$. As can be seen, this process of disarming and rearming is repeated during the processing interval $T_{PI}$, so long as the relatively high count rate is sustained.

As a consequence of the MCA being disarmed during the processing interval $T_{PI}$, a period of time less than the processing interval $T_{PI}$, i.e., an armed time, is actually used as the sample time $T_S$ to gather pulse fragments (or samples).

Thus, in order to accurately determine the count rate of received electrical pulses, the time periods $T_1, T_2, T_3, T_4, T_5,$ and $T_6$ during which samples are gathered are added together to calculate the sample time $T_S$. In other words, the processing interval $T_{PI}$ is interleaved with periods during which the MCA is disarmed, and a shorter period of time, the actual sample time $T_S$, is the time during which samples are actually gathered. Thus, in order to accurately determine the rate at which electrical pulses are received during the sampling time, an adjustment (or accounting) must be made for the interleaved disarm periods. Such accounting is made as follows:

$$\text{adjusted count rate } (cps) = \frac{\text{total trigger pulses counted}}{\text{arm time } (T_S)}$$

Note that not all of the trigger pulses 218 are counted when the MCA is disarmed, i.e., included in the total gross count, as shown on the fourth horizontal axis 238. Thus, the total trigger pulses 218 counted or total gross count is a count of those trigger pulses that occur during the sample time $T_S$ (or arm time), regardless of whether their corresponding pulse fragments indicate a piled up pulse or an overrange pulse.

While the above-described interleave processing provides a fairly accurate representation of the actual count rate during the sample time $T_S$, it should be noted that, because of the random nature of the electrical pulses received, the gross count rate may not be exactly equal to the actual physical count rate. Over several processing intervals $T_{PI}$, however, the gross count rate is averaged and therefore yields a very good approximation of the actual physical count rate.

Ideally, the FIFO buffer 63 will not overflow, and the pulse fragments and count rates can be processed based on, i.e., a sample time $T_S$ can be, the 600 ms processing interval $T_{PI}$. However, as is depicted in FIG. 11, the electrical pulses may be received more quickly than the MCA is able to process them. As a result, there are two cases where the sample time can be less than the 600 ms processing interval.

The first case occurs in the event the FIFO buffer 63 fills up during the segment processing time $T_{SP}$. In this case, all of the pulse fragments in the FIFO buffer 63 (i.e., all of the ADC samples in the FIFO buffer 63) must be discarded since there is no way of knowing how many ADC samples were lost after the FIFO buffer 63 filled up. Because, in this case, no useable pulse fragments are collected during the segment processing time, the segment processing time must be discarded or subtracted from the 600 ms processing interval to obtain an accurate sample time.

In the second case, described briefly above, the FIFO buffer 63 fills up faster than the digital signal processor 64 can extract and process the pulse fragments. In this case the MCA is "disarmed" before the FIFO buffer 63 fills up, i.e., the MCA is disarmed when the FIFO buffer 63 is "almost full". When the system is disarmed, no pulse fragments, i.e., no ADC samples, are allowed to enter the FIFO buffer 63. The digital signal processor 64 empties and processes the pulse fragments already in the FIFO buffer 63 while the MCA is "disarmed," and then "rearms" the MCA. This process of disarming and rearming, referred to herein as interleave processing, continues as required by the filling of the FIFO buffer 63 until the end of the segment processing interval. Thus, at high count rates such as those depicted in FIG. 11 the storing of pulse fragments in the FIFO buffer 63 is "interleaved" with periods during which the MCA is disarmed and no pulse fragments are stored in the FIFO buffer 63.

The real time efficiency (RTE %) of the MCA is preferably displayed on the display device, and indicates the current percentage of real time (i.e., the percentage of the processing interval $T_{PI}$) used to collect the pulse fragments. The RTE % is:

$$RTE\ \% = (\text{sample time}/600\ \text{ms}) \times 100\%$$

As mentioned above, sample time $T_S$ is the total time within the 600 ms interval during which the MCA is able to collect pulses, i.e., the total time the MCA is armed. In other words, the sample time is the sum of all the "armed" times from all of the interleaved time periods, including the time during segment processing if the pulse fragments from the segment processing period $T_{SP}$ are not discarded.

The count rate at which interleaving occurs, or the point where RTE% becomes less than 100%, depends on the PST, and the rate at which the electrical pulses are received. In the event the PST is 1.0 μs, the interleaving begins when the count rate approximately equals 2E5 cpm.

In addition to providing an energy spectrum or histogram, and the total gross count rate, the MCA generates count rates within a user-defined region of interest (ROI). The ROI is defined by the user entering a range of energies, which corresponds to a range of pulse heights, for which the user is interested in generating a count rate. The range of energies is entered using a keyboard or keypad that is a part of the input/output circuit 68. There are two types of count rates generated in response to the ROI count rate processing. The first is for use in real-time on-line monitoring and is referred to herein as smooth counts per minute (SCPM). The second is referred to as integrated counts per minute (ICPM), and is used in non-real-time to obtain an "integrated" count rate over a desired integration time called integrated seconds (ISECS). The SCPM and ICPM are calculated for each region of interest within the energy spectrum. The SCPM from any region of interest can be used as a source of activity level for any channel. The ICPM value is primarily used at the input/output circuit 68 to measure accurate concentration levels for calibration purposes. The SCPM, ICPM and ISECS are updated during the segment processing period and displayed on the input/output circuit 68.

The following shows the SCPM calculation:

$$\frac{ROI\ \text{counts during sample time}}{\text{sample time}} \times 60\ s = ROI\ cpm \rightarrow \text{smoothing} \rightarrow ROI\ SCPM$$

The ROI count, i.e., count of those electrical pulses having a pulse height that corresponds to an energy level that is within the user-defined region of interest (ROI), collected during the sample time $T_S$ are converted into the ROI count rate. The ROI count rate value is a "raw" count rate or unfiltered counts per minute value which fluctuates due to the random input nature of the pulses. This value is filtered using a smoothing routine so as to eliminate rapid fluctuations in its magnitude due to the random nature of the electrical pulses.

The calculation for ICPM is:

$$\frac{\text{total } ROI \text{ counts from restart}}{ISECS(n)} \times 60\ s \longrightarrow ROI\ ICPM,$$

and, $$ISECS(n) = ISECS(n-1) + \text{sample time}(n),$$

where, $ISECS(n)$—integrated second at current 600 ms
$ISECS(n-1)$—integrated second at previous 600 ms interval sample time(n)—sample time ($T_S$) at current 600 ms interval Thus, the integrated seconds increments by the sample time $T_S$ during each 600 ms processing interval. If there is no interleaving, then the ISECS increments in real time, i.e., 600 ms, otherwise only a fraction the 600 ms, i.e., the sample time $T_S$, is added to the ISECS value. The integrated count rate is simply the total integrated or processed counts within the region of interest divided by the time over which they were integrated (ISECS).

To this point the calculations for SCPM and ICPM have been described without including correction for "dead time". As used herein, "dead time" is the period of time during which pulses were not collected or processed due to pulse pileup. Note that "dead time" is to be distinguished from the disarm time, during which no ADC samples are stored because the FIFO buffer 63 is almost full, or has filled up during segment processing. The "dead time" is time during which ADC samples are collected but discarded due to their being piled up. As discussed above, there are two ways in which this system can detect pulse pileup: (1) Baseline not restored (a second trigger signal occurring before the BLR time has expired), and (2) A second "trigger" signal occurred during the PST.

Pulses that occur when the baseline is not restored are considered piled-up and are not collected. The time during which such pulses are received is time that is lost, i.e., "dead time". The time during which pulses are collected but not processed due to the occurrence of more than one "trigger" signal during the PST is also considered "dead time". These lost pulses introduce error into the count rate calculations and must be compensated for. In order to compensate for this type of "dead time," the total gross count of trigger pulses is needed, i.e., the total number of "trigger" pulses received. The digital signal processor 64 maintains the total gross count of the generated trigger pulses. Within the total gross count, some of the Gaussian-shaped pulses are processed into the database, some are processed as "overrange", and the rest are discarded due to distortion caused from pulse pileup. "Processed pulses" are those pulses that can clearly be discerned and processed as either being within or outside (overrange) the channels of the MCA, i.e., the MCA's energy spectrum. Some of the data that cannot be processed (non-"processed pulses") due to pulse pileup belongs within the MCA's energy spectrum, and some outside or above the energy spectrum.

An assumption is made that the distribution of the discarded pulses follows the same distribution as the processed pulses. This assumption is reasonable because of all the electrical pulses entering the MCA have the same statistical probability of being discarded due to pulse pileup. Thus, the statistically random nature of the input pulses ensures that the pileup is in no way correlated to the energy or pulse height. Based on this assumption, a correction factor is generated. The correction factor is referred to as the pulse processing efficiency (PPE), and can be used to scale all of the processed data:

$$PPE = \frac{\text{total counts within spectrum} + \text{overrange counts}}{\text{total gross pulses}}$$

Thus, by scaling the processed pulses (counts within the energy spectrum plus overrange counts) by the PPE, accounting can be made for the pulse fragments discarded due to pulse pileup during each sample time.

Note that scaling the processed pulses only estimates where the lost data would have been if it was processed. The accuracy (sensitivity) of the resulting corrected data is limited to the accuracy of the processed data before the PPE correction factor is applied. The PPE correction factor only corrects the "mean" or average value of the processed data and not the sensitivity. This is because accuracy is based on total number of counts or pulses collected and processed. Since only the exact quantity of the discarded pulse fragments is known, not the exact distribution, correction can be made only for its magnitude or "mean value" and not for accuracy or sensitivity.

The PPE can be used to compensate for "dead time" in the rate calculations for SCPM and ICPM. Since the rate calculation is in counts per unit time, the PPE can be used to scale up the counts or scale down the time in order to increase and correct the count rate. For example, by using PPE to scale down the sample time used in both the SCPM and ICPM calculations above, the "raw cpm" is effectively increased to the correct "mean" value for the SCPM calculation, and the rate of increase of ISECS is decreased in the ICPM calculation. Thus, as pileup increases, the PPE decreases, causing the SCPM's sensitivity to decrease, and the integrate time (ISECS) to slow down. PPE does not affect the accuracy of the ICPM value, rather it affects the real time it takes to get to a desired accuracy.

It is important to note that dead time correction is not a correction to a problem created by the present invention, rather it is a correction and improvement made to the common problem of pulse pileup encountered in radiation detection. Many conventional MCA's accept or only signal the errors caused by pulse pileup. The present invention provides the capability to automatically and accurately correct these count rates above the normal levels (~2E5 cpm) when pulse pileup becomes significant.

The PPE correction works very well for moderate levels of pulse pile-up and overrange counts, however, when the PPE begins to fall below 1% and/or overrange increases significantly, this factor becomes less reliable. This will typically happen at only extremely high count rates, in excess of 10E7 cpm or higher. To know when these conditions occur, the PPE percentage (PPE %), i.e., PPE×100, and the percentage of overrange pulses (OVR %) are preferably displayed by the input/output circuit 68, where $$OVR\% = \frac{\text{overrange counts}}{\text{total gross pulses} \times PPE} \times 100\%$$

Note, since overrange counts are processed counts, they too are scaled by the PPE factor just as counts are that are within the region of interest.

The database is passed to the control circuit from the memory device. This database is displayed on the display device that is part of the input/output circuit 68. The display device is used in detector calibration, on-line spectral analysis, isotope detection, high-voltage power adjustment etc. The display device, in combination with the keyboard or keypad can also be used to select, zoom in on and observe the region of interest (ROI) for any desired energy level (channel) or groups of levels (channels) so as to detect any isotope.

Referring back to FIG. 11, as in FIG. 10, when the relatively low count rate of pulses is received, the digital signal processor 64 increments a location in the memory device 66b that corresponds to the determined pulse height, and reads the next pulse fragment from the FIFO buffer 63 after determining pulse heights. The determination of pulse height is carried out as described above in connection with FIG. 9.

As shown also in FIG. 11, not every pulse fragment from the FIFO buffer 63 results in a valid pulse height determination, i.e., some of the stored pulse fragments constitute "dead time". For example, the pulse pileup flag bit may be set as the pulse fragment is stored into the FIFO buffer 63. The pulse fragments 214 that are counted in the memory device 66b, i.e., the pulse fragments that are not piled up, are shown on a third horizontal axis 236, and the trigger signal 218 is represented on a fourth horizontal axis 238.

Referring next to FIG. 12, an illustration is shown of a graphical display that is generated on the display device, e.g., a cathode ray tube display, that is a preferred part of the An input/output circuit 68 described above. As can be seen, the histogram of the energies of the particles that impact a scintillation counter is displayed in response to the counts for each channel that are stored in the memory device 62b. The region of interest, is shown as a darkened "highlighted" region of the histogram, and various other values and parameters, which are described herein, are also shown.

In this way, accurate pulse height analysis is performed on electrical pulses within an electrical signal that are received into a multi-channel analyzer. Advantageously, such analysis includes the accurate detection and compensation for baseline drift, pulse pileup, and noise.

While the invention herein disclosed has been described by means of specific embodiments and applications thereof, numerous modifications and variations could be made thereto by those skilled in the art without departing from the scope of the invention set forth in the claims.

APPENDIX A

© 1992 - 1993

SORRENTO ELECTRONICS

```
/************************************************************************
/*
/* Name: pdabpha.c
/*
/* Processor: PDA
/*
/* Inputs:
/*    Arguments: None
/*    Globals: None
/*    Hardware: None
/*
/* Outputs:
/*    Arguments: None
/*    Globals: None
/*    Hardware: None
/*
/* Calls:
/*
/* Descriptions:
/*    This is the Pulse Data Acquisition Board (PDAB) Pulse Height Analysis
/*    (PHA) routine.  Its main function is to process the pulse data in the fifo
/*    into the Multi-channel analyzer and to keep track of all timing data used
/*    in calculating count rates.  Upon entering, this routine checks the fifo
/*    to see if it is full since it was accepting data prior to this routine
/*    which processes it.  If it is full, the data and the time must be discarded
/*    since it is unknown how much data was lost.  If it is not full, the main
/*    processing loops are entered which processed the fifo data at the same time
/*    the fifo is being filled.  When the input rate to the fifo exceeds the rate
/*    at which the data can be processed, the system is disarmed and the fifo
/*    emptied.  Once the fifo is emptied, it is rearmed and processing continues.
/*    At the same time the "armed" times are kept for count rate calculations.
/*    This process is continues until the ISR signals the end of the pha phase.
/*    When this happens the fifo is disarmed and emptied before exiting the
/*    loops within the routine.  Just before exiting the routine the system is
/*    rearmed to allow pulses to be captured during the segment processing
/*    section.  This allows all pulses below a certain count rate to be captured.
/*    In addition the gross trigger counts, overrange counts, total mca counts
/*    are measured for pulse pileup and dead time correction.
/*
/* Revisions:
/*    Original - Richard Battista    6/24/92
/*    Revision - Rich Battista 8/23/93
/*               Added change to incorporate no segment dead time at lower
/*               rates.
/*
/************************************************************************/

/* Include files: */
#include "pda_dpm.h"
#include "globals.h"

#define TRIG_MASK 0x8000      /* adc data mask for trigger bit */
#define PPD_MASK  0x4000      /* adc data mask for pulse pileup bit */
#define ALMOST_FULL 0x4       /* mask for fifo almost full bit is status byte */
#define FULL 0x40             /* mask for fifo full bit is status byte */
#define TEST 1                /* test mode value */
#define NOT_EMPTY 0x2         /* mask for fifo empty bit is status byte */
#define PULSE_FC 0.1
#define BL_FC 0.1
#define BUFFER_START_INDEX 12 /* start at 300ns after pulse trigger */
```

```
#define OVERFLOW_MASK 0x400
#define NOT_EMPTY 0x2
define DATA_MASK 0x3ff pulse_height_analysis()
    {
    int trig, trig_prev, ppd_flag, n, discard_last_pulse;
    int  pulse_height, pulse_data_available;
    int fifo_data, status, overflow_flag, fifo_status;
    int sample_index, x[MAX_SAMPLES];
    int delay, peak_index, max_count, index;
    long stop_count;
    char *status_ptr,*cntl_reg_ptr;
    float peak, y;
    const float k1=0.142359, k2=0.143923, k3=0.145061, k4=0.145417;

/* set temp pointers for speed */ status_ptr = bc_ptr+0xc;    /* to avoid calc during fifo processing */
    cntl_reg_ptr = bc_ptr+4;

/* Set 2 wait states to read status hardware
/* Read FIFO almost full status flag (flag updated on WCLK of fifo)
*/
    *wait_ptr = TWO_WAIT_STATES;
    status = (*status_ptr&0x47); /* Read status byte for /paf only */

/* (Note: At this point, the fifo must be tested to see if data was lost
/*  from fifo overflow.  IF so, this data and the integration time must
/*  be discarded.  The almost full flag is checked instead of the full
/*  flag since this allow more time to reach the processing section.  The
/*  full flag can be one sample away from full when read as not full.  This
/*  means that multiple pulses may be lost in the time it take to disarm
/*  and process the fifo.  To be safe the almost full flag is used.)
/* If status indicates FIFO is almost Full or mca restart flag is true
/* then (Discard FIFO data during segment processing)
/*    Disarm
/*    Reset MCA gross trigger counter
/*    Allow time for potential pulse to finish
/*    Clear FIFO
/*    Rearm
/*    Mark time at start of arming
/*    Clear disarm flag
/*    Clear mca_restart_flag
/*    end (Discard FIFO data during segment processing)
*/
    if(!(status&ALMOST_FULL) || mca_restart_flag )
       {
       control_reg &= 0xfe;
       *wait_ptr = TWO_WAIT_STATES;
       *cntl_reg_ptr = control_reg;   /* disarm fifo input */
       delay = 20;                    /* delay in case in the middle of saving puls
       while(delay!=0)
          --delay;
       *t0_gcr_ptr = MCA_TRIG_CNTR_RESTART; /* clear mca gross trigger counts */
       *bc_ptr = 0;                   /* reset fifo */
       control_reg |= 0x01;
       *cntl_reg_ptr = control_reg;   /* rearm trigger input */
       last_start_count = *t1_counter_ptr; /* Time stamp start of arm */
       disarm_flag = 0;
```

```
            mca_restart_flag = 0;           /* clear since only used here */
        }

/* Initialize start of pulse height analysis (pha) variables
*/
    *wait_ptr = ZERO_WAIT_STATE;
    end_pha_flag = 0;            /* Global set to 1 by ISR to exit pha loop */
    mca_sample_time_count = 0;   /* Integrated "armed" time withing 600ms */
    no_of_test_pulses = 1;       /* allow for first test loop to pass single puls
    no_trig_flag = 1;            /* Set flag, Used for NO_TRIG indication */
    pulse_sets_gen = 0;          /* Self test pulse set counter */
    overflow_flag = 0;
    ppd_flag = 0;
    total_pulses_processed = 0;  /* reset total pulse processed counter for mcacp
    baseline_sum = 0;
    no_of_baselines = 0;
    peak_index_sum = 0;
    no_of_peaks = 0;

/* Main pulse acquisition loop. Processing will remain in this loop
/* until the start segment flag is true and the remaining FIFO data is processed
*/
    do        /* do until next processing segment starts */
      {
        trig_prev = 0;               /* reset for edge triggering on new pulse */
        pulse_data_available = 0;    /* No data avail in pulse buffer when fifo empty *
        discard_last_pulse = 0;      /* reset incomplete last pulse flag */
        sample_index = 0;
        max_count = 0;

/*      (Test pulse generator)
/*      if(input selects test input)
/*      then (generate test pulses at test input)
*/
        if((mode == TEST) && !disarm_flag)
          {
/*      Note: DO NOT change number of wait states or delay values within this
/*            pulse generator since this will affect the selftest results.
*/
            *wait_ptr = TWO_WAIT_STATES;

/* start seg flag prevents sending pulses after interrupt sub */
        /* routine stops the mca gross counter */ for(n=0;(n<no_of_test_pulses)&&(!end_pha_flag);++n)
              {
                ++pulse_sets_gen;
                *(bc_ptr+0x0a) = 0;     /* send pulse for pileup not counted on MCA */
                                        /* Counted on window and gross channels */
                delay = 3;              /* delay at least 300ns, set delay loop for nex
                *(bc_ptr+0x0a) = 0;     /* pileup previous pulse not counted on MCA*/
                                        /* Not counted on window and gross channels */
                while(delay!=0)         /* delay next pulse past pulse sample time */
                    --delay;
                *(bc_ptr+0x0a) = 0;     /* send next pulse before baseline restored */
                                        /* Not counted on MCA */
                                        /* Counted on window and gross channels */
                delay = 40;             /* allow test circuitry to recharge */
                while(delay!=0)         /* wait until baseline restored */
                    --delay;
```

```
                *(bc_ptr+0x0a) = 0;      /* send only pulse to be counted on MCA */
                                         /* Counted on window and gross channels */
                delay = 80;              /* allow test circuitry to recharge */
                while(delay!=0)          /* wait until baseline restored for next cycle
                    --delay;
                }

++no_of_test_pulses;    /* increment until FIFO overflows */
            } /* end for test mode only */

/* if disarmed and not end of pha
/* then (rearm system)
/*    Set to two wait states for hardware control
/*    Rearm system
/*    Continue mca gross trigger counter
/*    Save value of interrupt counter to measure starting time
/*    Clear disarm flag
*/
        if(disarm_flag && !end_pha_flag)
            {
            *wait_ptr = TWO_WAIT_STATES;
            control_reg |= 0x01;
            *cntl_reg_ptr = control_reg;
            *t0_gcr_ptr = MCA_TRIG_CNTR_CONT;
            last_start_count = *t1_counter_ptr;
            disarm_flag = 0;
            }

/*    (Begin processing pulse data)
/*    (Note: Processing remains in this inner loop until the fifo
/*      hardware status bit is read as empty.  The fifo can be
/*      emptied only in this loop which reads and processes the data.
/*      Since the fifo can be filled at the same time this loop is
/*      emptying it, the only way to ensure empty and exiting this loop
/*      is to stop the data from entering the fifo by "disarming" the fifo
/*      input.  Disarming is done in this loop based on a flag set in
/*      the ISR on a timed basis and if the fifo fills up faster than
/*      the processor can remove it.  The end_pha_flag, which indicates
/*      it is time to exit this modules and start segment processing, will
/*      disable the input to the fifo (if not already disabled from fifo
/*      almost full) and allow this inner loop to empty
/*      and process the remaining data.  When the fifo is empty, and its
/*      /ef bit recognized, the inner loop is exited, and the same flag
/*      is used to exit the outter loop and the module. This loop is also
/*      exited if the fifo is emptied before additional pulse data is added
/*      to the fifo.  This can easily happen at the lower pulse rates.  If
/*      the end_pha_flag has not yet been set, the empty flag will
/*      continue to be polled.  Once another pulse occurs, and data enters
/*      the fifo, the inner loop is rentered, again exiting only when the fifo
/*      is empty from no more pulse data due to no pulses or being disarmed.
*/
        do
            {
/*          (Note: The following executes when the system is armed and the
/*           ISR routine has signaled the end of the pulse height analysis
/*           segment.)
/*          if armed and end of pha
/*          then (Disarm system when end of pha)
/*              Set disarm flag
/*              set to two wait states for hardware control
```

```
/*          Disarm fifo write
/*          Return to zero wait states
/*          Hold the mca gross trigger counter
*/
            if(end_pha_flag)
               if(!disarm_flag)   /* split for speed */
               {
                  disarm_flag = 1;                /* Signal system is disarmed */
                  *wait_ptr = TWO_WAIT_STATES;
                  control_reg &= 0xfe;
                  *cntl_reg_ptr = control_reg;    /* disarm fifo input */
                  *wait_ptr = ZERO_WAIT_STATE;    /* 0 wait states */
                  *t0_gcr_ptr = MCA_TRIG_CNTR_HOLD;  /* Hold after slower trigger disarm */

/*          Read rolled over interrupt counter and add the period count
/*          Add the difference of the last sampling period to the integrated count
*/
                  stop_count = *t1_counter_ptr + timer1_period_count;
                  mca_sample_time_count += (stop_count - last_start_count);
               } /* end disarm system when end of pha */

/*          (Read fifo and status)
/*          Set to two wait states for fifo read
/*          Read fifo word containing the new count value, trigger bit,
/*           overrnage bit and the pulse pileup bit.
/*          Return to zero wait states
*/
            *wait_ptr = TWO_WAIT_STATES;
            fifo_data = *fifo_ptr;     /* read first to update /ef flags */
            *wait_ptr = ZERO_WAIT_STATE;

/*          if fifo is not empty
/*          then (read and process fifo data)
*/
            if(fifo_status=(*status_ptr&NOT_EMPTY))       /* if not empty */
               {
               /* (Note: status and data only valid if read non-empty fifo) */

/*          Extract next ADC count
*/
               x[sample_index] = fifo_data&DATA_MASK;

/*          Find peak index for PST control system
*/
               if(x[sample_index] >= max_count)
                  {
                  max_count = x[sample_index];
                  peak_index = sample_index;
                  }

/*          Increment and limit buffer index
*/
               if(++sample_index > MAX_SAMPLES)
                  {
                  sample_index = MAX_SAMPLES;
                  overflow_flag = 1;             /* set flag to discard pulse */
                  background_test_error = 1;    /* signal hardware failure */
                  }

/*          Extract trigger bit value from fifo data
```

```
/*          Latch overflow bit if it occurs
*/
            trig = fifo_data&TRIG_MASK;      /* get trigger status for next count *
            overflow_flag |= (fifo_data&OVERFLOW_MASK); /* latch adc overflow bit /* If the trigger bit is one
/* Then (test if previous is 0) (trig bit is high between 1 to 4
/*          samples at the start of each pulse)
/*      If previous trig is zero
/*      The (0 to 1 transistion has occurred, new pulse starting)
*/
            if(trig) /* Separate from trig_prev for speed in collecting data */
            {
                no_trig_flag = 0;   /* clears when at least one trigger occurs */ if(!trig_prev)
                {
                /* Test the pulse pileup bit of last pulse here on start
                /* of new pulse instead of during each fifo read for speed
                */
                    if(fifo_data&PPD_MASK)   /* get pulse pileup data for previous p
                        ppd_flag = 1;

/* If pulse data available
                /* then (process baseline)
                /*      Filter first seven baseline values with same filter
                /*      as peak filter.
                */
                    if(pulse_data_available)
                    {
                        baseline = k1 * x[0] +
                                   k2 * x[1] +
                                   k3 * x[2] +
                                   k4 * x[3] +
                                   k3 * x[4] +
                                   k2 * x[5] +
                                   k1 * x[6];

/* Accumulate baselines for later averaging.
                    /* (The average baseline is used to control the baseline adjust
                    */
                        baseline_sum += baseline;
                        ++no_of_baselines;
                    }

/* First check last pulse data for overrange and pulse pileup.
                /* If the data is overrange due to pileup then do not count as
                /* a true overrange pulse.  (Note: This will only count overrange
                /* pulses if the overrange bit was set and no pulse pileup occurre
                /* during the pulse sample time, however, overrange pulses which
                /* are also piled up will not be counted as overrange.  Overrange
                /* pulse count is used to calculate statistics by adjusting the
                /* total gross mca counts to total gross mca counts within the
                /* mca spectrum.  Also overrange percentage is calculated.
                 */
                    if(overflow_flag || ppd_flag || !pulse_data_available)
                    {
                        if(overflow_flag && !ppd_flag && pulse_data_available)
                            ++overrange_counts;
                    }
```

```
        else
            {   /* else process pulse height of previous data */
                /* when not piled-up, overranged and if data is available /* (Filter the pulse data to find the peak)
        /* (Note: A FIR filter is used to process the peak samples.
        /*  The average peak index is used to locate the approximate
        /*  center of the peak samples.  To ensure the FIR filter
        /*  uses the samples which results in the highest peak, the
        /*  calculation is done eight times about the estimated peak an
        /*  the highest peak value of the eight calculations is used.
        */
            peak = 0.0;
            for(n=(int)(peak_index_avg-7);n<(int)peak_index_avg+1;++n)
                {
                y = k1 * x[n]   +
                    k2 * x[n+1] +
                    k3 * x[n+2] +
                    k4 * x[n+3] +
                    k3 * x[n+4] +
                    k2 * x[n+5] +
                    k1 * x[n+6];
                if(y>peak)
                    peak = y;
                } peak_index_sum += peak_index;  /* sum for average calc */
            ++no_of_peaks;

/* Calculate the pulse height from the filtered peak */
        /* and the filtered baseline
        /* Scale to compensate for non zero baseline */ pulse_height = (peak - baseline + 0.5);

if( (pulse_height < MAX_CHANNELS) && /* prevent high saturat
                (pulse_height > 0) )
                {
                ++(*(ch_ptr+pulse_height));
                ++total_pulses_processed;
                }
            else
                ++overrange_counts;  /* save for pp correction */

} /* end if not over or pileup */ pulse_data_available = 1;  /* Indicate that prev data available
            overflow_flag = 0;
            ppd_flag = 0;
            max_count = 0;
            sample_index = 0;

}  /* end prev trig is zero (transitions from 0 to 1) */
        } /* end trig bit is one */ trig_prev = trig;         /* save previous trigger */

}  /* end if not empty */

/* If fifo almost full then disarm and process fifo until empty
```

```c
/* (Note: This checks the previously read status and knows based on
/* maximum input pulse rate and remaining FIFO room (after almost
/* full) that the fifo will not "fill up" by the time it reaches
/* this disarm code on paf (fifo almost full) true.
*/
   if(!disarm_flag)     /* if armed */
      {                          /* Spit for speed, will be disarmed most of time @
      *wait_ptr = TWO_WAIT_STATES;
      status = (*status_ptr&ALMOST_FULL); /* Read status byte for /paf only
      *wait_ptr = ZERO_WAIT_STATE;        /* 0 wait states */
      if(!status)    /* if almost full */
         {
         disarm_flag = 1;              /* set disarm flag to true */
         control_reg &= 0xfe;
         *wait_ptr = TWO_WAIT_STATES;
         *cntl_reg_ptr = control_reg;  /* disarm fifo input */
         *wait_ptr = ZERO_WAIT_STATE;     /* 0 wait states */
         *t0_gcr_ptr = MCA_TRIG_CNTR_HOLD; /* Hold after slower trigger dis

*t1_gcr_ptr = HOLD_INT_CNTR;  /* effectively disable ISR */
         stop_count = *t1_counter_ptr; /* read interrupt counter */
         if(end_pha_flag)            /* is ISR occurred just before hold */
             stop_count += timer1_period_count;  /* add offset */
         *t1_gcr_ptr = CONT_INT_CNTR;  /* continue interrupt counter */

/* Calculate the last period the fifo was armed for rate calculations
/* (Note: Depending on the rate the fifo can be armed and disarmed
/*  many times between segment processing (eg. dpm updates). It is
/*  important to keep track of the time in which the pulses where
/*  accumulated in order to calculate integration time
*/
      mca_sample_time_count += (stop_count - last_start_count);

/* Signal if fifo not disarmed in time after almost full indication
/* This should only happen at very high rates, and/or if the pulse sa
/* time is very long. (Note: It assumes that the time from the
/* status read through to the second to this point is less than one
/* baseline restore time (~6us), since this would indicate that only
/* one pulse was lost during this armed time.
*/
         *wait_ptr = TWO_WAIT_STATES;
                                    /* ff updated on wclk */
         if(!(*status_ptr&FULL))    /* if FIFO full */
            {
            discard_last_pulse = 1; /* dont save incomplete last pulse in
            no_of_test_pulses = 1;  /* reset #pulses back to one */
            ++pulses_thrown_away;   /* for selftest only */
            }
         *wait_ptr = ZERO_WAIT_STATE;    /* 0 wait states */

} /* end if almost full */

} /* end if armed */

} while(fifo_status);  /* end (read pulses until FIFO is empty */
/* Test last fifo read for pulse pileup bit */ if(fifo_data&PPD_MASK)    /* get pulse pileup data for previous pulse */
       ppd_flag = 1;
```

```
/* If pulse data available
/* then (process baseline)
/*    Filter first seven baseline values with same filter
/*    as peak filter.
*/
    if(pulse_data_available)
        {
        baseline = k1 * x[0] +
                   k2 * x[1] +
                   k3 * x[2] +
                   k4 * x[3] +
                   k3 * x[4] +
                   k2 * x[5] +
                   k1 * x[6];

/* Accumulate baselines for later averaging.
    /* (The average baseline is used to control the baseline adjust
    */
        baseline_sum += baseline;
        ++no_of_baselines;
        }

/* (Note: If the FIFO is empty there are no more 0 to 1 transitions to
/*  initiate the pulse height processing of the last pulse data collected.
/*  A flag set on the first 0 to 1 transition is used to process the
/*  last pulse.  Not processing the last data collected could greatly affect
/*  the MCA spectrum and ROI cpm for low count rates.
*/
    if(!discard_last_pulse  && /* Process if last pulse not cutoff */
       pulse_data_available && /* and prev data was saved */
       !overflow_flag &&       /* and not overflowed */
       !ppd_flag)              /* and not piledup */
        {

/* (Filter the pulse data to find the peak)
    /* (Note: A FIR filter is used to process the peak samples.
    /*  The average peak index is used to locate the approximate
    /*  center of the peak samples.  To ensure the FIR filter
    /*  uses the samples which results in the highest peak, the
    /*  calculation is done eight times about the estimated peak and
    /*  the highest peak value of the eight calculations is used.
    */
        peak = 0.0;
        for(n=(int)(peak_index_avg-7);n<(int)peak_index_avg;++n)
            {
            y = k1 * x[n]   +
                k2 * x[n+1] +
                k3 * x[n+2] +
                k4 * x[n+3] +
                k3 * x[n+4] +
                k2 * x[n+5] +
                k1 * x[n+6];
            if(y>peak)
                peak = y;
            } peak_index_sum += peak_index;   /* save for PST adjust */
        ++no_of_peaks;
```

```
    /* Calculate the pulse height from the filtered peak */
    /* and the filtered baseline */ pulse_height = (peak - baseline + 0.5);

if( (pulse_height < MAX_CHANNELS) &&
            (pulse_height > 0) )
            {
            ++(*(ch_ptr+pulse_height));
            ++total_pulses_processed;
            }
        else
            ++overrange_counts;   /* save for pp correction */

} /* not piledup or overrange */
    else
        {
        if(overflow_flag && !ppd_flag && pulse_data_available &&
            !discard_last_pulse)
            {
            ++overrange_counts;   /* save for pp correction */
            }
        overflow_flag = 0;
        ppd_flag = 0;
        }

} while(!end_pha_flag || !disarm_flag);   /* end do while not start segment
/* (Note: The following rearms the MCA acquisition to decrease the dead
/* time during segment processing.  This is only advantageous at low count
/* rates since the data will be discarded if the FIFO fills up before
/* the end of the segment processing and the next beginning of this module.)
*/

/* Clear totoal mca trig counter
/* Reset fifo
/* Arm hardware to start saving pulse data
/* Clear disarm flag
/* Restart interrupt timer
/* Set last start count to zero
*/
    mca_gross_trigger_counts = *t0_counter_ptr; /* read since end of seg */
    *wait_ptr = TWO_WAIT_STATES;
    *bc_ptr = 0;                /* reset fifo */
    control_reg |= 0x01;
    *cntl_reg_ptr = control_reg;   /* arm mca channel */
    *t0_gcr_ptr = MCA_TRIG_CNTR_RESTART;/* Zero mca trig counter and start counti
                                    /* Perform after slower h/w arming */
    last_start_count = *t1_counter_ptr;   /* Save start count or time */
    disarm_flag = 0;

*wait_ptr = ZERO_WAIT_STATE;
    }
```

APPENDIX B

© 1994

SORRENTO ELECTRONICS

JUNK.TEM            June 23, 1994            Page 1

```
/* (Basline Control Algorithm)
    (This section controls the level shifter stage of the mca channel.
    The level shifter applies a bipolar offset to the conditioned signal
/*  to offset DC errors and to shift the base of the pulse to start
/*  at the ADC's negative bipolar input.  ADC count of zero is at -1.75v.
/*  This algorithm will dymanically adjust the level shift to always
/*  maintain the base of the pulse at the MIN_BASELINE value which will
/*  not be zero.  This is because this control system can not determine
/*  how much less than zero the pulse is starting at or how saturated low
/*  the pulse is.  Therefore a value just above zero is used to allow
/*  detection of when the pulse is saturating low.  The input to the system
/*  is the average number of baseline values calculated in the pulse height
/*  acquisition segment (600ms).  This average value is a floating point
/*  average of where the pulses started.  Based on this, the level shift
/*  offset is adjusted to move the base of the pulse toward the desired value
/*  which is the MIN_BASELINE.  If the high voltage or the internal gain is
/*  changed to cause a large DC offset change which moves the average baseline
/*  to a large value (eg. 250 ADC count), then the system will used this number
/*  to adjust the level shift offset as to close the gap between 250 and
/*  the MIN_BASELINE.  To ensure stability, the adjustments are made to
/*  close the gap by approximately half (asymptotically approach MIN_BASELINE)
/*  to avoid over adjusting.  The compensation is not symetric since there is
/*  small variance between ADC 0 and the MIN_BASELINE, thus adjusting
/*  out of negative saturation is slower than adjusting the baseline down.
/*  The baseline will only be adjust if pulse data is present or number
/*  of baselines averaged is not zero.
*/
    if(no_of_baselines > 0)   /* if pulses present */
      {

/*   Calculate average of all baselines calculated in the last 600ms
/*   segment
*/
      baseline_avg = baseline_sum/((float)no_of_baselines+.00001);

/* (Determine which direction to compenstate)
/* if the baseline is too high
/* then (Shift the ADC input down)
/*    (Note: Increment the DAC level shift value will result in adding
/*       a negative offset to the ADC input since the DAC voltage is applied
/*       to an inverting summing circuit.)
/*    Add the difference between the baseline avg and MIN_BASELINE to the
/*       DAC level shift value.
/*         (Note: The following is the transfer function from the DAC to the
/*         ADC:
/*
/* (2.4mV change)  10V        10k         332                 (change @ ADC)
/* (for 1 DAC bit) ----   x  -----   x  --------   =  .9719mV (.28 ADC bit change)
/*                 4096      5.11k      1.3k + 332
/*
/* Thus, adjusting the DAC by the ADC baseline error each time will result
/*  in the ADC error being corrected by 28% per update.
'*
    Variations in the baseline (say 1%) will have little to no effect on the
/* resolution of the pulse height since the pulse height are calculated
/* by subtracting the peak from the baseline for each pulse and not the peak
/* from the MIN_BASLINE.  The baseline is kept close to zero to maximize
/* the ADC range and to eliminate non-linearity errors when pulse heights
```

JUNK.TEM          June 23, 1994          Page 1-2

```
/* are calculated with baselines that start far from ADC 0.

if(baseline_avg>(MIN_BASELINE))
        level_shift += (int)(baseline_avg-MIN_BASELINE);   /* Adj by 28% */ if((baseline_avg<MIN_BASELINE)&&(level_shift>0))       /* if too low */
        level_shift -= (int) ((MIN_BASELINE-baseline_avg)*5.0);
    if(level_shift<0)
        level_shift=0;
    if(level_shift>4095)
        level_shift=4095;

*(bc_ptr+0x14) = level_shift;       /* dac 1c lsb */
    *(bc_ptr+0x15) = level_shift >> 8;  /* dac 1c msb */
    }
```

What is claimed is:

1. A device for performing pulse height analysis on a detector signal in a multi-channel analyzer used in radiation monitoring, said device including:

a pulse conditioner coupled to the detector signal, the pulse conditioner including means for filtering, means for shaping and means for digitizing the detector signal, and further including means for generating a pulse data signal in response to the means for filtering, the means for shaping and the means for digitizing;

a trigger circuit coupled to the detector signal, the trigger circuit including means for detecting pulses in the detector signal and means for generating a trigger signal in response to the means for detecting the pulses;

a signal processor coupled to the pulse conditioner, and the trigger circuit, the signal processor including means for performing the pulse height analysis on the pulse data signal, and for determining a gross number of pulses detected by the trigger circuit in response to the trigger signal;

a control circuit coupled to the signal processor, to the trigger circuit, and to the pulse conditioner, the control circuit including means for controlling the filtering, shaping and digitizing within the pulse conditioner, and further including means for controlling timing within the pulse conditioner and within the signal processor; and a clock circuit coupled to the control circuit, the clock circuit including means for generating a clock signal, the clock circuit being coupled to the means for controlling timing within the pulse conditioner and within the signal processor.

2. The device of claim 1 wherein said pulse conditioner includes:

a low pass filter that is coupled to said detector signal;

a Gaussian pulse shaper coupled to the low pass filter, the Gaussian pulse shaper including means for shaping said pulses into Gaussian-shaped pulses.

3. The device of claim 2 including:

an analog-to-digital converter coupled to said Gaussian pulse shaper, and to said signal processor, and analog-to-digital converter including means for digitizing said Gaussian-shaped pulses so as to generate said pulse data signal;

said low pass filter being an anti-alias filter for said analog-to-digital converter.

4. The device of claim 3 wherein said pulse conditioner includes:

a programmable baseline adjuster coupled to said Gaussian pulse shaper and to said signal processor, the programmable baseline adjuster including means for adjusting a baseline of said Gaussian-shaped pulses so as to utilize at least 95% of a dynamic range of said analog to digital converter, and so as to maintain the baseline at a substantially constant voltage.

5. The device of claim 4 wherein said means for adjusting said baseline adjusts said baseline so as to utilize at least 99.5% of said dynamic range.

6. The device of claim 3 including:

a memory buffer coupled to said analog-to-digital converter, the memory buffer including means for receiving said pulse data signal from said analog to digital converter, the memory buffer further including means for storing said pulse data signal from said analog to digital converter, and means for retrieving said pulse data signal and for passing said pulse data signal to said signal processor.

7. The device of claim 6 wherein said pulse conditioner includes:

a programmable gain amplifier coupled to an electrical signal and to said signal processor via said control circuit, the programmable gain amplifier including means for amplifying the electrical signal and for generating the detector signal in response thereto;

said signal processor including means for generating a programmable gain signal in response to which the means for amplifying amplifies the electrical signal.

8. The device of claim 7 wherein said memory buffer is a first in first out buffer.

9. An apparatus for pulse height analysis of a pulse signal in a multi-channel analyzer, wherein the apparatus includes:

a pulse conditioner coupled to the pulse signal, the pulse conditioner including means for generating a Gaussian-shaped signal in response to the pulse signal;

an analog-to-digital converter coupled to the pulse conditioner, the analog-to-digital converter including means for converting the Gaussian-shaped signal into a pulse data signal;

a trigger circuit coupled to the pulse signal, the trigger circuit including means for detecting pulses within the pulse signal, and the trigger circuit further including means for generating a trigger signal in response to the pulses;

a signal processor coupled to the pulse data signal and to the trigger signal, the signal processor including means for performing the pulse height analysis on the pulse data signal and means for generating a pulse analysis signal in response thereto, the pulse height analysis including pulse-pileup detection; and a controller coupled to the pulse conditioner, the analog-to-digital converter, the signal processor, and the trigger circuit, the controller including means for causing the pulse conditioner to perform baseline adjustment on the pulse signal, the controller further including means for causing the analog-to-digital converter to convert the Gaussian-shaped signal into the pulse data signal, the controller including means for generating an output signal in response to the pulse analysis signal and the trigger signal, the output signal being indicative of the number of at least a portion of the pulses detected in the pulse signal over time; and an output device coupled to the controller for receiving the output signal from the controller, and for communicating the number of pulses in the at least a portion of the pulses detected in the pulse signal.

10. The device of claim 9 wherein said pulse conditioner includes:

a low pass filter that is coupled to said pulse signal, said low pass filter being an anti-alias filter for said analog to digital converter;

a Gaussian pulse shaper coupled to the low pass filter, the Gaussian pulse shaper including means for shaping said pulses into Gaussian-shaped pulses.

11. The device of claim 10 wherein said pulse conditioner includes:

a programmable baseline adjuster coupled to said Gaussian pulse shaper and to said signal processor, the programmable baseline adjuster including means for adjusting a baseline of said Gaussian-shaped pulses so as to utilize at least 95% of a dynamic range of said analog-to-digital converter to digitize pulses within a prescribed energy spectrum, and so as to maintain the baseline between a prescribed range of voltages.

12. The device of claim 11 including:

a memory buffer coupled to said analog to digital converter, the memory buffer including means for receiving said pulse data signal from said analog to digital converter, means for storing said pulse data signal from said analog to digital converter, and means for retrieving said pulse data signal and for passing said pulse data signal to said signal processor.

13. In a multi-channel analyzer, a method of pulse height analysis of a pulse signal, wherein the method includes:

(a) detecting pulses within the pulse signal;

(b) generating a trigger signal in response to the detecting of pulses in step (a);

(c) shaping the pulse signal so as to generate a Gaussian-shaped signal;

(d) detecting pulses within the Gaussian-shaped signal;

(e) detecting pulse pile-up within the Gaussian-shaped signal in response to the trigger signal and in response to the detecting of the pulses in step (d);

(f) detecting pulse height of at least a portion of the pulses that are detected in step (d); and (g) counting the number of at least a portion of the pulses detected in step (d), wherein the at least a portion is selected based in the detecting in step (e).

14. In a multi-channel analyzer, the method of claim 13, wherein the method includes interleaving the detecting in step (d) with at least one interleave period wherein pulses are not detected within the Gaussian-shaped signal, wherein the interleaving occurs only in the event the pulses are detected at a rate that exceeds a prescribed pulse processing rate.

15. In a multi-channel analyzer, the method of claim 13 including:

adjusting a baseline of said pulse signal so as to maintain the baseline between a prescribed range of levels.

16. In a multi-channel analyzer, the method of claim 13 including:

amplifying said pulse signal before said shaping and before said adjusting, the amplifying being in response to a programmable gain signal that controls the amount by which said pulse signal is amplified.

17. In a multi-channel analyzer, the method of claim 16 including:

digitizing, after said shaping and said adjusting, said Gaussian-shaped signal.

18. In a multi-channel analyzer, the method of claim 17 including:

limiting, before said digitizing, the range of said Gaussian-shaped pulse to within a prescribed range of voltages.

19. In a multi-channel analyzer, the method of claim 17 including:

storing, after said digitizing, said Gaussian-shaped signal; and retrieving, before said detecting in step (f), said Gaussian-shaped signal.

20. In a multi-channel analyzer, the method of claim 19 wherein said shaping includes:

integrating said pulse signal; and differentiating said pulse signal so as to generate said Gaussian-shaped signal.

* * * * *